US011649043B2

(12) United States Patent
Fenny et al.

(10) Patent No.: US 11,649,043 B2
(45) Date of Patent: *May 16, 2023

(54) TILTED PROPELLERS FOR ENHANCED DISTRIBUTED PROPULSION CONTROL AUTHORITY

(71) Applicant: Bell Textron Inc., Fort Worth, TX (US)

(72) Inventors: Carlos Alexander Fenny, Fort Worth, TX (US); Jouyoung Jason Choi, Southlake, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 79 days.

This patent is subject to a terminal disclaimer.

(21) Appl. No.: 17/406,174

(22) Filed: Aug. 19, 2021

(65) Prior Publication Data
US 2021/0380230 A1 Dec. 9, 2021

Related U.S. Application Data

(63) Continuation of application No. 16/013,201, filed on Jun. 20, 2018, now Pat. No. 11,136,115.

(51) Int. Cl.
B64C 27/08 (2006.01)
B64C 39/06 (2006.01)
(Continued)

(52) U.S. Cl.
CPC ............ B64C 27/08 (2013.01); B64C 39/062 (2013.01); B64D 27/26 (2013.01); G05D 1/0202 (2013.01);
(Continued)

(58) Field of Classification Search
CPC ..... B64C 27/08; B64C 27/20; B64C 29/0025; B64C 39/001; B64C 39/06; B64C 39/062; B64D 27/02
See application file for complete search history.

(56) References Cited

U.S. PATENT DOCUMENTS 5,419,514 A 5/1995 Ducan
5,595,358 B1 1/1997 Demidov et al.
(Continued)

FOREIGN PATENT DOCUMENTS

DE 102005013391 A1 9/2006
EP 3098161 A1 11/2016
(Continued)

OTHER PUBLICATIONS

European Patent Office, European Search Report for EP Application No. 18185618.8 dated Jan. 31, 2019, 4 pp.
(Continued)

Primary Examiner — Richard Green
(74) Attorney, Agent, or Firm — Edwin S. Flores; Daniel J. Chalker; Chalker Flores, LLP

(57) ABSTRACT

An aircraft comprises a fuselage, one or more support structures connected to the fuselage, one or more engines or motors disposed within or attached to the one or more support structures or the fuselage, and a distributed propulsion system. The distributed propulsion system comprising two or more propellers symmetrically distributed in an array along the one or more support structures with respect to a center of gravity of the aircraft and operably connected to the one or more engines or motors, wherein each propeller has a rotation direction within a tilted plane of rotation, and a summation of horizontal force vectors created by the tilted plane of rotation of all the propellers is substantially zero when all the propellers are creating a substantially equal thrust magnitude. Movement of the aircraft is controlled by selectively increasing or decreasing a thrust of at least one of the two or more propellers.

20 Claims, 38 Drawing Sheets

(51) Int. Cl.
  *B64D 27/26* (2006.01)
  *G05D 1/02* (2020.01)
  *G05D 1/08* (2006.01)
(52) U.S. Cl.
  CPC ..... *G05D 1/0808* (2013.01); *B64D 2027/262* (2013.01)

(56) References Cited

U.S. PATENT DOCUMENTS

| | | |
|---|---|---|
| 8,485,464 B2 | 7/2013 | Kroo |
| 9,663,237 B2 | 5/2017 | Senkel et al. |
| 9,764,833 B1 | 9/2017 | Tighe et al. |
| 9,908,616 B1 | 3/2018 | Horn et al. |
| 10,059,437 B2 | 8/2018 | Cooper |
| 10,518,875 B2 | 12/2019 | Judas et al. |
| 2009/0008499 A1 | 1/2009 | Shaw |
| 2011/0031355 A1 | 2/2011 | Alvarez |
| 2011/0226892 A1 | 9/2011 | Crowther et al. |
| 2016/0318609 A1 | 11/2016 | Lynn et al. |
| 2017/0121034 A1 | 5/2017 | Fisher et al. |
| 2018/0029693 A1 | 2/2018 | Vander Lind et al. |
| 2018/0044011 A1 | 2/2018 | Riechert |
| 2018/0057155 A1 | 3/2018 | Riechert |
| 2018/0065736 A1 | 3/2018 | Sebesta |
| 2018/0105279 A1 | 4/2018 | Tighe et al. |
| 2019/0138568 A1 | 5/2019 | Chien |

FOREIGN PATENT DOCUMENTS

| | | |
|---|---|---|
| EP | 3243750 A1 | 11/2017 |
| WO | 2017210595 A2 | 12/2017 |
| WO | 2017210595 A3 | 12/2017 |
| WO | 2018075412 A1 | 4/2018 |

OTHER PUBLICATIONS

European Patent Office, Communication pursuant to Article 94(3) EPC for EP Application No. 18185618.8 dated Feb. 15, 2019, 7 pp.
European Patent Office, Communication pursuant to Article 94(3) EPC for EP Application No. 18185618.8 dated Jul. 22, 2019, 4 pp.
European Patent Office, Communication pursuant to Article 94(3) EPC for EP Application No. 18185618.8 dated Jan. 13, 2020, 4 pp.
European Patent Office, Communication pursuant to Article 94(3) EPC for EP Application No. 18185618.8 dated Jul. 8, 2020, 4 pp.
European Patent Office, Communication pursuant to Article 94(3) EPC for EP Application No. 18185618.8 dated Dec. 21, 2020, 5 pp.
European Patent Office, Communication pursuant to Article 94(3) EPC for EP Application No. 18185618.8 dated Jun. 2, 2021, 6 pp.
Garrow, Oliver—Title: "Proto10 hovering and translating at NASA AMES" by Oliver Garrow, Published/Posted on Aug. 19, 2017, Site Name:youtube:com, URL:https://www.youtube.com/watch?v=KdGo0Gikx_Y&feature=youtu.be.

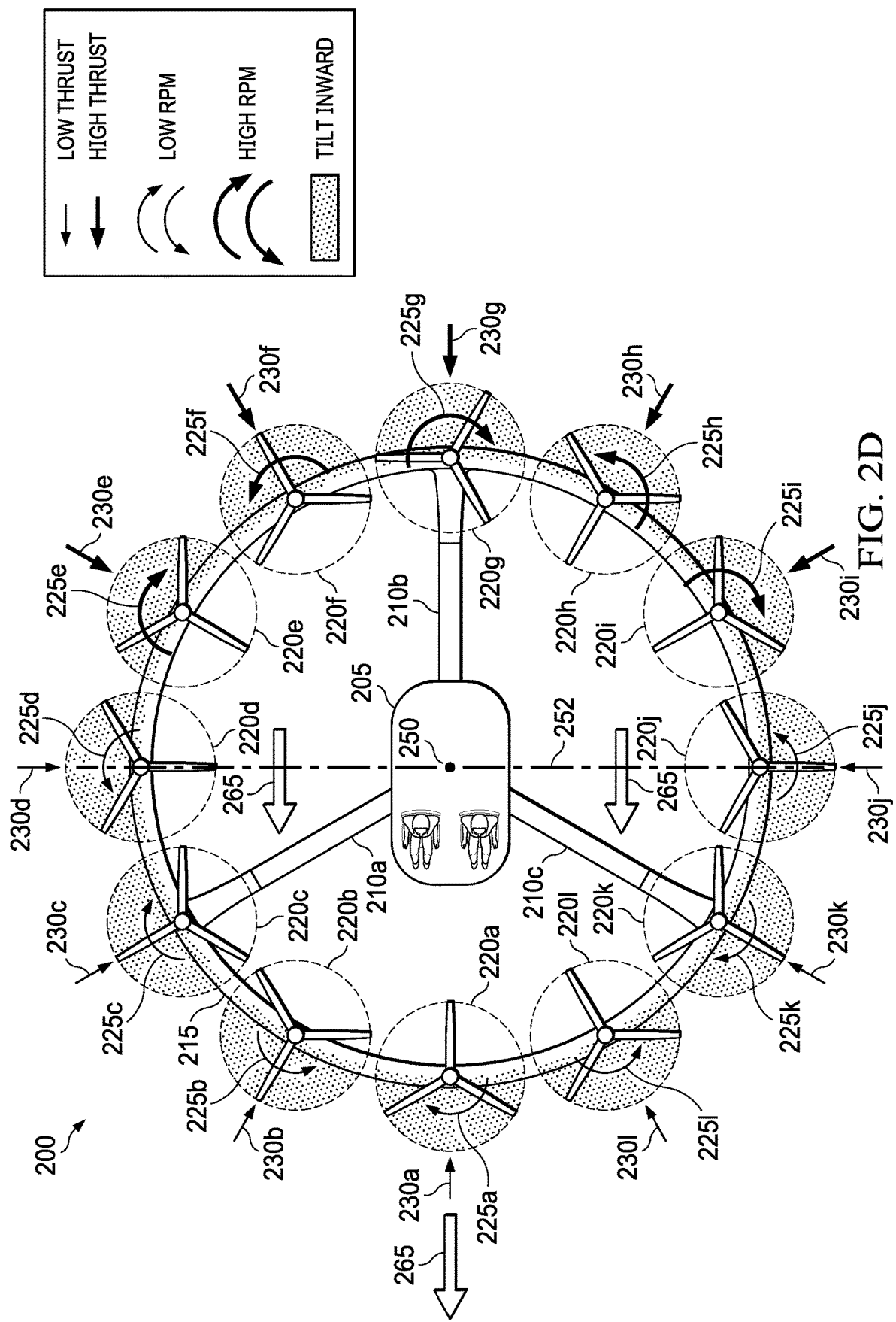

TILTED PROPELLERS FOR ENHANCED DISTRIBUTED PROPULSION CONTROL AUTHORITY

CROSS-REFERENCE TO RELATED APPLICATIONS

This application is a continuation patent application of and claims priority to U.S. patent application Ser. No. 16/013,201, filed on Jun. 20, 2018 entitled "Tilted Propellers for Enhanced Distributed Propulsion Control Authority", the entire contents of which are incorporated herein by reference.

STATEMENT OF FEDERALLY FUNDED RESEARCH

Not applicable.

TECHNICAL FIELD OF THE INVENTION

The present invention relates in general to the field of aircraft flight control and propulsion. In particular, the present invention relates to vertical-takeoff-and-landing (VTOL) aircraft with distributed propulsion.

BACKGROUND OF THE INVENTION

Without limiting the scope of the invention, its background is described in connection with aircraft with distributed propulsion.

One example of an aircraft is a vertical-takeoff-and-landing (VTOL) aircraft. Some VTOL aircraft have distributed propulsion, in which thrust is spread around the aircraft by using three or more propellers and primarily using speed control to vary thrust for flight control. In such aircraft, the elimination of complex cyclic and collective controls plus the inherent redundancy provide coast, weight, and safety benefits. On small VTOL aircraft, distributed propulsion works very effectively to provide acceptable flight control authority. However, when used on medium and large VTOL aircraft, the higher aircraft weight and rotational inertia result in unacceptable flight control authority for safe flight. While it is feasible to add excessive power margin and cyclic and collective control to distributed propulsion systems, to enhance control authority, doing so eliminates the benefit of the distributed propulsion system.

The conventional practice of mounting all of the propellers in a distributed propulsion system in the same plane or in parallel planes results in all thrust vectors on a vertical direction for lift. For an aircraft with this configuration to move laterally (left or right) or longitudinally (forward or aft), the aircraft must first roll for lateral motion of pitch for longitudinal motion. To roll or pitch that aircraft must overcome the aircraft's rotational inertia about the roll or pitch axes before any lateral or longitudinal motion can occur. This results either in an unacceptable lag in the aircraft response to control commands or a requirement to incorporate an excessive power margin into the aircraft.

Existing methods and apparatuses for flight control with a distributed propulsion system are inadequate for safe flight or undercut the use of distributed propulsion system. Methods and apparatuses for flight control with a distributed propulsion system without an excessive power margin and without cyclic and collective controls are desirable.

SUMMARY OF THE INVENTION

One embodiment of the present invention provides an aircraft having a distributed propulsion system comprising a fuselage, one or more support structures connected to the fuselage, and one or more engines or motors disposed within or attached to the one or more support structures or the fuselage. The distributed propulsion system comprises two or more propellers symmetrically distributed in an array along the one or more support structures with respect to a center of gravity of the aircraft and operably connected to the one or more engines or motors, wherein each propeller has a rotation direction within a tilted plane of rotation, and a summation of horizontal force vectors created by the tilted plane of rotation of all the propellers is substantially zero when all the propellers are creating a substantially equal thrust magnitude. Movement of the aircraft is controlled by selectively increasing or decreasing a thrust of at least one of the two or more propellers. In one aspect, a summation of horizontal torque vectors created by the rotation direction of all the propellers is substantially zero when all the propellers are creating the substantially equal thrust magnitude. In another aspect, the movement comprises a lateral motion, a longitudinal motion or a combination thereof without rolling and/or pitching the aircraft. In another aspect, the movement comprises a pitch, a roll, a yaw, a translation or a combination thereof.

Another embodiment of the present invention provides a method of controlling an aircraft using a distributed propulsion system comprising providing one or more engines or motors disposed within or attached to one or more support structures or a fuselage of the aircraft, providing the distributed propulsion system comprising two or more propellers symmetrically distributed in an array along the one or more support structures with respect to a center of gravity of the aircraft and operably connected to the one or more engines or motors, wherein each propeller has a rotation direction within a tilted plane of rotation, creating a summation of horizontal force vectors by the tilted plane of rotation of all the propellers that is substantially zero when all the propellers are creating a substantially equal thrust magnitude, and controlling a movement of the aircraft by selectively increasing or decreasing a thrust of at least one of the two or more propellers. In one aspect, the method further comprises providing a control authority that is greater than that of a non-tilted distributed propulsion system. In another aspect, the method further comprises controlling the movement with a control lag that is less than that of a non-tilted distributed propulsion system. In another aspect, controlling the movement of the aircraft comprises producing a lateral motion, a longitudinal motion or a combination thereof without rolling and/or pitching the aircraft. In another aspect, controlling the movement of the aircraft comprises creating a pitch, a roll, a yaw, a translation or a combination thereof. In another aspect, the method further comprises creating a summation of horizontal torque vectors by the rotation direction of all the propellers that is substantially zero when all the propellers are creating the substantially equal thrust magnitude.

The following aspects correspond to both the aircraft and the method of controlling the aircraft. In one aspect, the two or more propellers are configured in one or more pairs of propellers, each pair of propellers comprising a first propeller creating a first thrust having a first horizontal force vector and a second propeller creating a second thrust having a second horizontal force vector, wherein a summation of the first horizontal force vector and the second horizontal force vector is substantially zero when the first thrust is substantially equal in magnitude to the second thrust. In another aspect, the two or more propellers are configured in one or more pairs of propellers, each pair of propellers comprising a first propeller having a first rotational axis within a first tangential plane, and a second propeller having a second rotational axis within a second tangential plane, wherein the first tangential plane and the second tangential plane are substantially parallel, the first propeller creates a clockwise thrust, and the second propeller creates a counterclockwise thrust. In another aspect, the two or more propellers are configured in one or more pairs of propellers, each pair of propellers comprising a first propeller having a first rotational axis, a second propeller having a second rotational axis, and a vertical axis disposed between the first propeller and the second propeller, wherein the first rotational axis and the second rotational axis are substantially coplanar with respect to the vertical axis, the first rotational axis has a negative tilt angle with respect to the vertical axis, the second rotational axis has a positive tilt angle with respect to the vertical axis, and the positive tilt angle and the negative tilt angle have a substantially equal magnitude. In another aspect, the rotation direction is clockwise for 50% of the two or more propellers and the rotation direction is counterclockwise for 50% of the two or more propellers. In another aspect, the tilted plane of rotation is tilted towards the center of gravity of the aircraft for all of the two or more propellers. In another aspect, the tilted plane of rotation is tilted towards the center of gravity of the aircraft for 50% of the two or more propellers and the tilted plane of rotation is tilted away from the center of gravity of the aircraft for 50% of the two or more propellers. In another aspect, the tilted plane of rotation is titled tangentially with respect to the center of gravity of the aircraft such that 50% of the two or more propellers create a clockwise thrust with respect to the center of gravity and 50% of the two or more propellers create a counterclockwise thrust with respect to the center of gravity. In another aspect, the one or more support structures comprise one or more booms, spokes, struts, supports or wings. In another aspect, the one or more support structures comprise a ring wing connected to the fuselage with one or more spokes, and the two or more propellers are equally spaced along the ring wing. In another aspect, the ring wing is circular shaped, oval shaped or ellipsoid shaped. In another aspect, the rotation direction of the two or more propellers disposed along the ring wing alternate between a clockwise direction and a counterclockwise direction. In another aspect, the tilted plane of rotation of the two or more propellers disposed along the ring wing alternate between tilted towards the center of gravity of the aircraft and tilted away from the center of gravity of the aircraft. In another aspect, the two or more propellers are configured in four or more pairs of propellers along the ring wing comprising: a first pair of propellers disposed along the ring wing, a second pair of propellers disposed along the ring wing, a third pair of propellers disposed along the ring wing, a fourth pair of propellers disposed along the ring wing, the rotation direction of the first pair and the third pair of propellers is counterclockwise, and the rotation direction of the second pair and the fourth pair of propellers is clockwise. In another aspect, the two or more propellers are fixed pitch propellers.

The foregoing is a summary and thus contains, by necessity, simplifications, generalizations, and omissions of detail. Consequently, those skilled in the art will appreciate that this summary is illustrative only and is not intended to be in any way limiting. Various other aspects, features and advantages of the aircraft and method of controlling the aircraft are set forth in the teachings of the present disclosure, such as the claims, text, and drawings set forth herein.

BRIEF DESCRIPTION OF THE DRAWINGS

For a more complete understanding of the features and advantages of the present invention, reference is now made to the detailed description of the invention along with the accompanying figures, in which:

FIG. 2D depicts a plan view of an aircraft with distributed propulsion in forward pitch and translation mode according to a particular embodiment of the present invention;

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1:
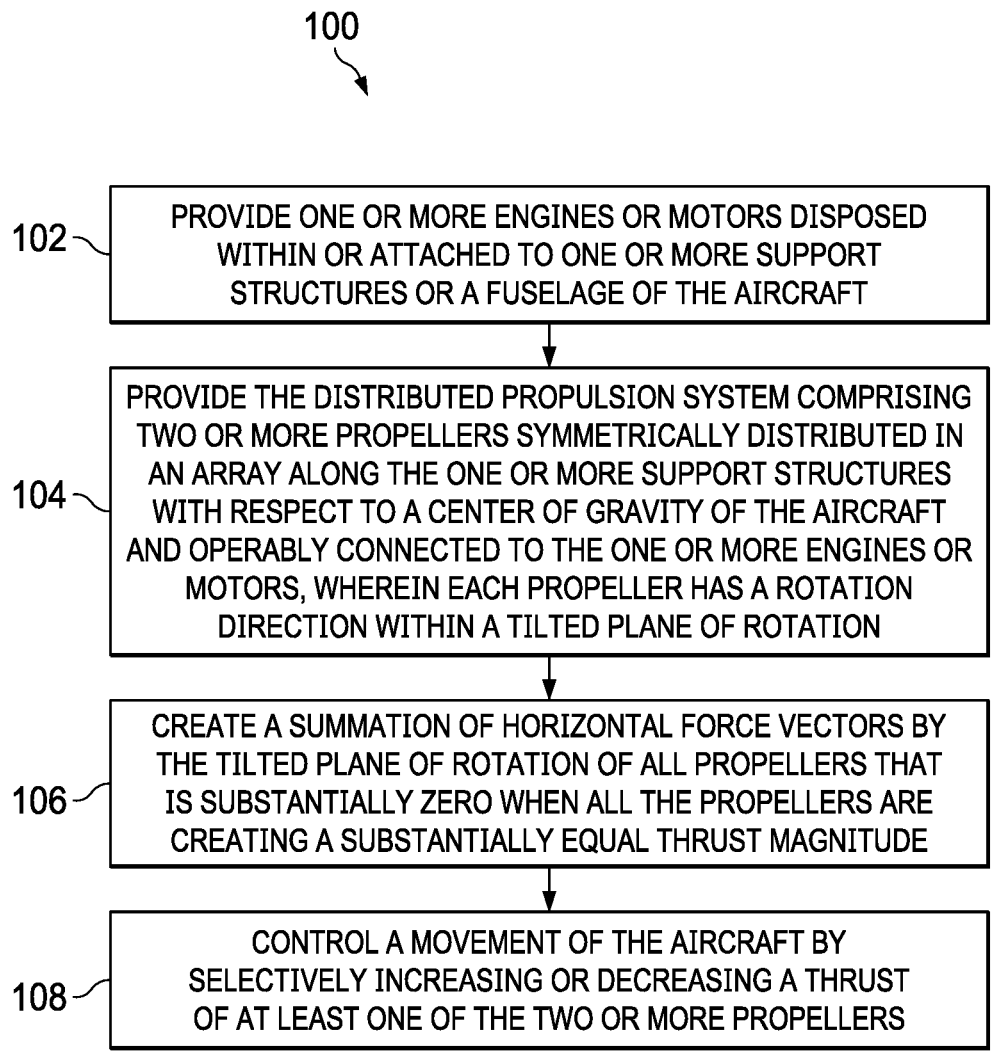
FIG. 1 depicts a flowchart of a method according to a particular embodiment of the present invention.

FIG. 1 depicts a flowchart of a method 100 of controlling an aircraft using a distributed propulsion system in accordance with a particular embodiment of the present invention. One or more engines or motors disposed within or attached to one or more support structures or a fuselage of the aircraft in block 102. The distributed propulsion system is provided in block 104 comprising two or more propellers symmetrically distributed in an array along the one or more support structures with respect to a center of gravity of the aircraft and operably connected to the one or more engines or motors, wherein each propeller has a rotation direction within a tilted plane of rotation. A summation of horizontal force vectors created by the tilted plane of rotation of all the propellers is substantially zero when all the propellers are creating a substantially equal thrust magnitude in block 106. A movement of the aircraft is controlled in block 108 by selectively increasing or decreasing a thrust of at least one of the two or more propellers.

As will be explained in more detail below in reference to various non-limiting examples of distributed propulsion systems described herein, the method provides a control authority that is greater than that of a non-tilted distributed propulsion system. In another aspect, the method controls the movement with a control lag that is less than that of a non-tilted distributed propulsion system. In another aspect, controlling the movement of the aircraft includes producing a lateral motion, a longitudinal motion or a combination thereof without rolling and/or pitching the aircraft. In another aspect, controlling the movement of the aircraft includes creating a pitch, a roll, a yaw, a translation or a combination thereof. In another aspect, the method creates a summation of horizontal torque vectors by the rotation direction of all the propellers that is substantially zero when all the propellers are creating the substantially equal thrust magnitude.

FIGS. 2A-2G, 3A-3K and 4A-4K depict aircraft 200, 300 and 400 with different distributed propulsion systems. These distributed propulsion systems are provided as examples and the scope of the present invention is not limited to these specific examples. Each aircraft in these figures includes a fuselage, one or more support structures connected to the fuselage, and one or more engines or motors disposed within or attached to the one or more support structures or the fuselage. The support structures can be any combination of booms, spokes, struts, supports or wings, and are not limited to the examples shown and described herein. Note that the closed or ring wing can be circular shaped as shown, oval shaped, ellipsoid shaped, or other suitable shape. Moreover, the number of spokes can be one, two, three (as shown), or four or more. Note that aircraft can be manned as shown, or unmanned. The distributed propulsion system includes two or more propellers symmetrically distributed in an array along the one or more support structures with respect to a center of gravity of the aircraft and operably connected to the one or more engines or motors. The location and number of propellers are not limited to the examples shown herein. The engine(s) or motor(s) can provide mechanical, electric or hydraulic power to the two or more propellers. Moreover, the engine(s) or motor(s) can be configured with respect to the propellers in a one-to-one or one-to-many arrangement.

FIGS. 2A-2G depict a plan view of a VTOL aircraft 200 with distributed propulsion in various flight modes according to a particular embodiment of the present invention. Aircraft 200 includes a fuselage 205, one or more support structures (e.g., spokes 210a, 210b, 210c, and closed or ring wing 215) connected to the fuselage 205, and one or more engines or motors (not shown) disposed within or attached to the one or more support structures (e.g., spokes 210a, 210b, 210c, and closed or ring wing 215) or the fuselage 205. The distributed propulsion system includes two or more propellers (e.g., propellers 220a through 220l) symmetrically distributed in an array along the one or more support structures (e.g., closed or ring wing 215) with respect to a center of gravity of the aircraft 200 and operably connected to the one or more engines or motors.

Figure 2A:
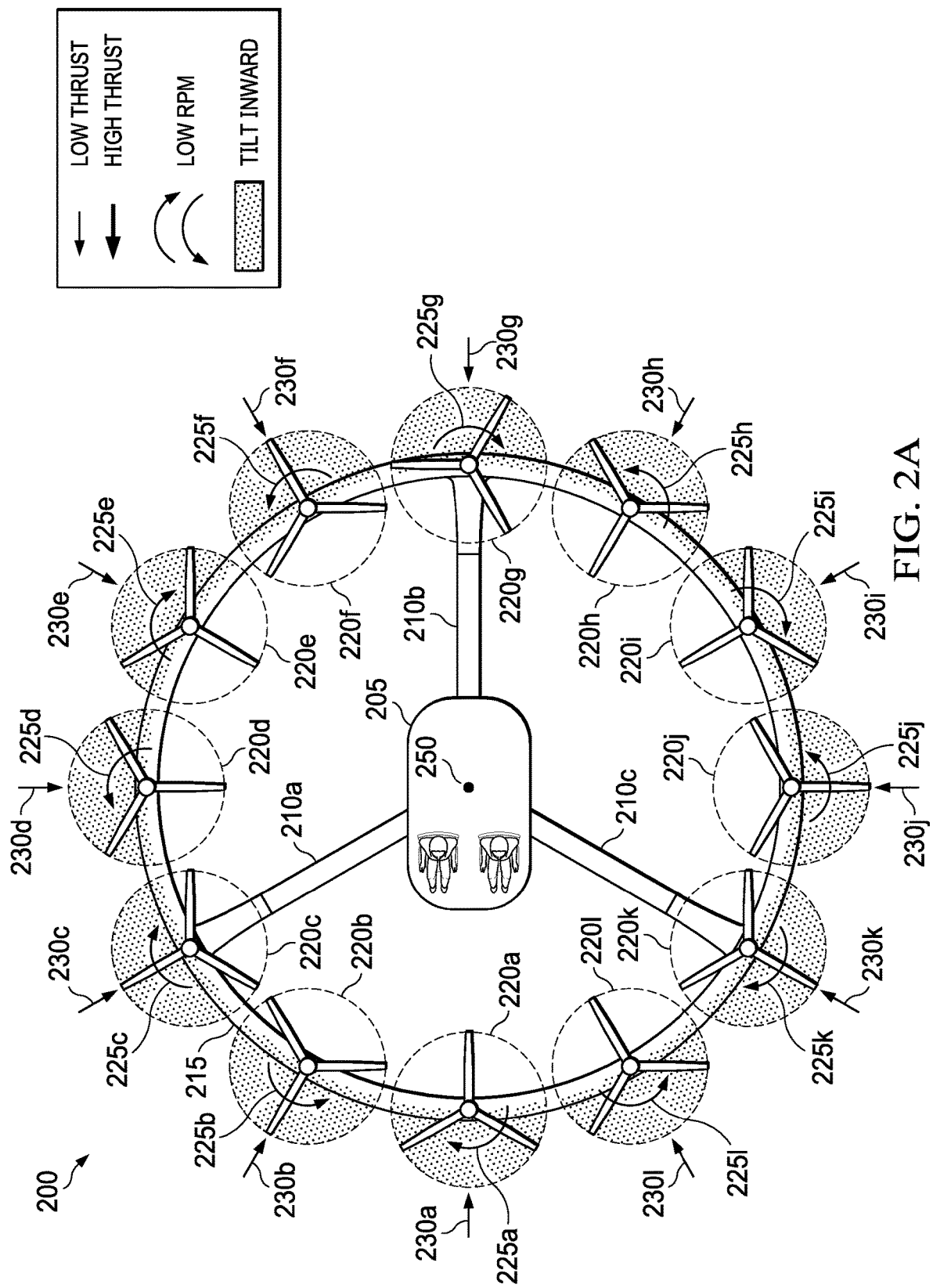
FIG. 2A depicts a plan view of an aircraft with distributed propulsion in hover mode according to a particular embodiment of the present invention.
Figure 2B:
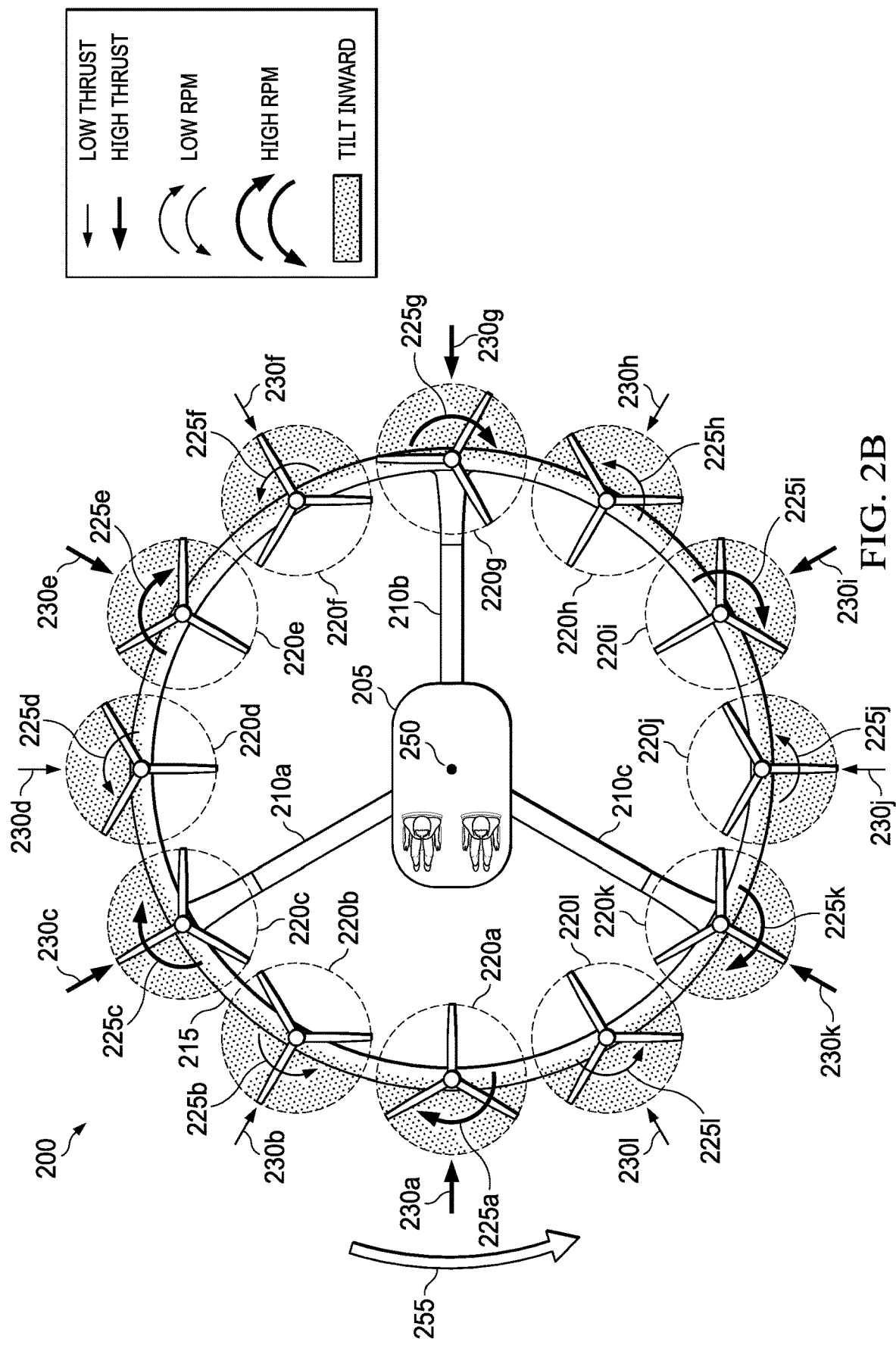
FIG. 2B depicts a plan view of an aircraft with distributed propulsion in a left yaw according to a particular embodiment of the present invention.
Figure 2C:
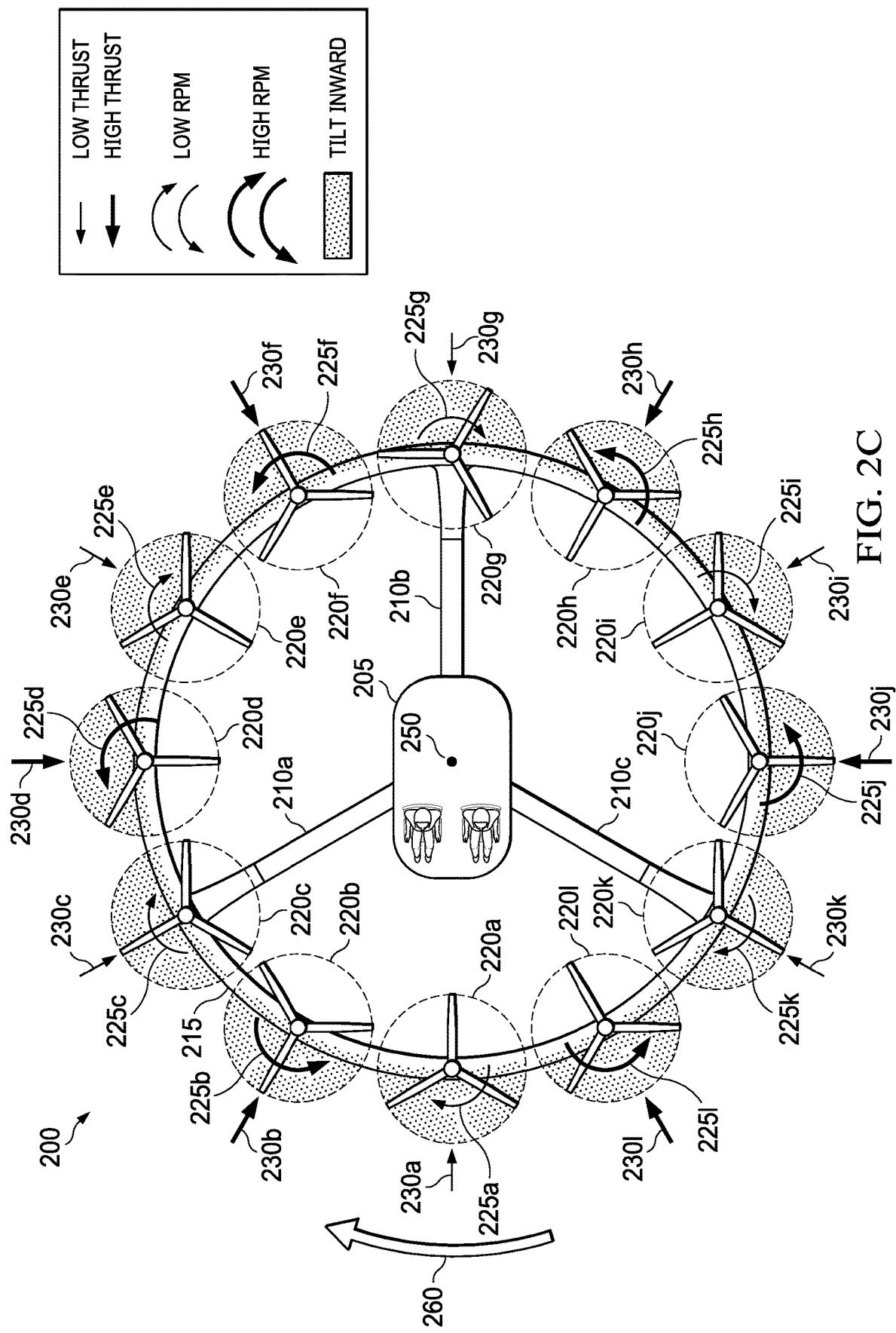
FIG. 2C depicts a plan view of an aircraft with distributed propulsion in a right yaw according to a particular embodiment of the present invention.
Figure 2E:
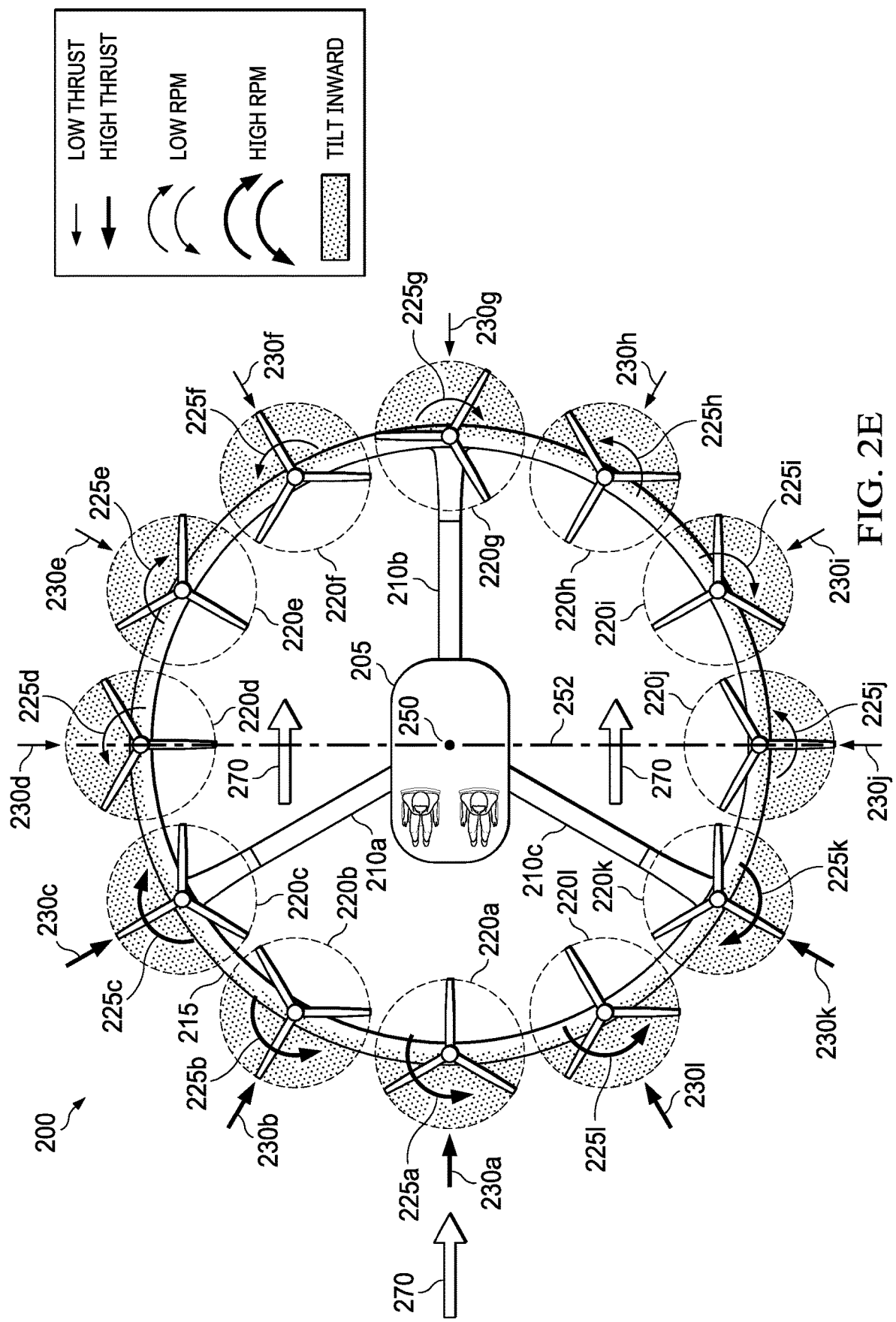
FIG. 2E depicts a plan view of an aircraft with distributed propulsion in aft pitch and translation mode according to a particular embodiment of the present invention.
Figure 2F:
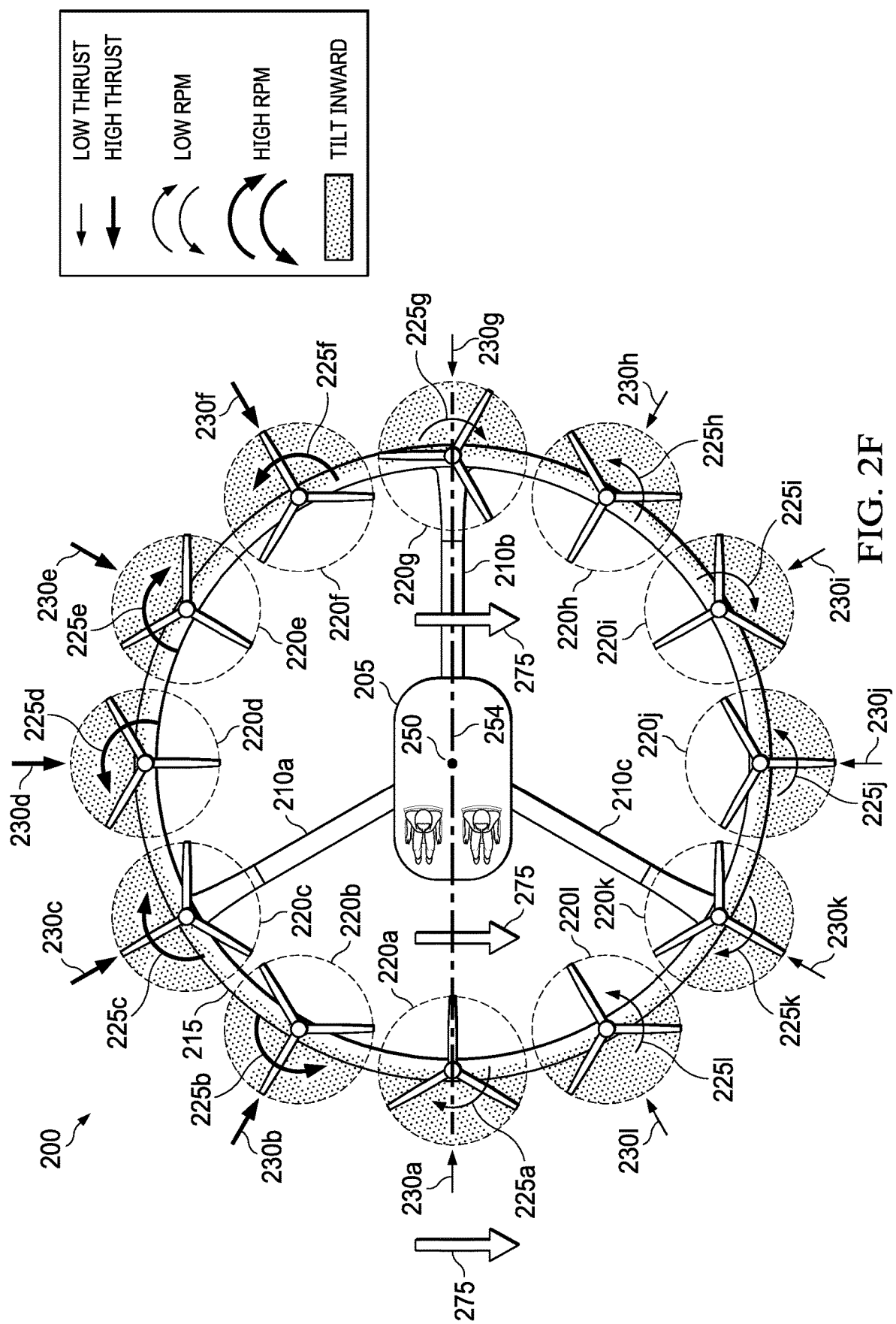
FIG. 2F depicts a plan view of an aircraft with distributed propulsion in left roll and translation mode according to a particular embodiment of the present invention.
Figure 2G:
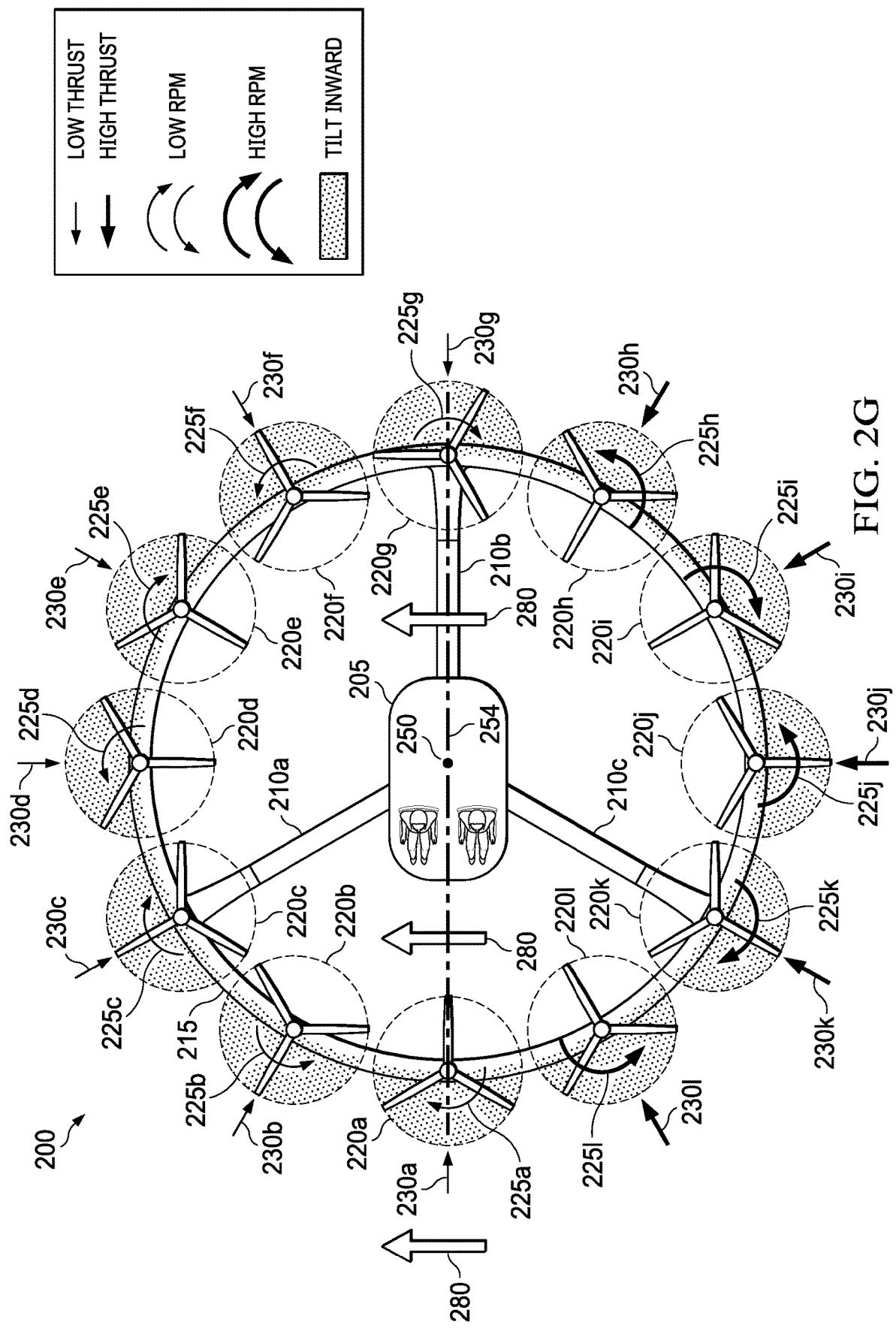
FIG. 2G depicts a plan view of an aircraft with distributed propulsion in right roll and translation mode according to a particular embodiment of the present invention.
Figure 2H:
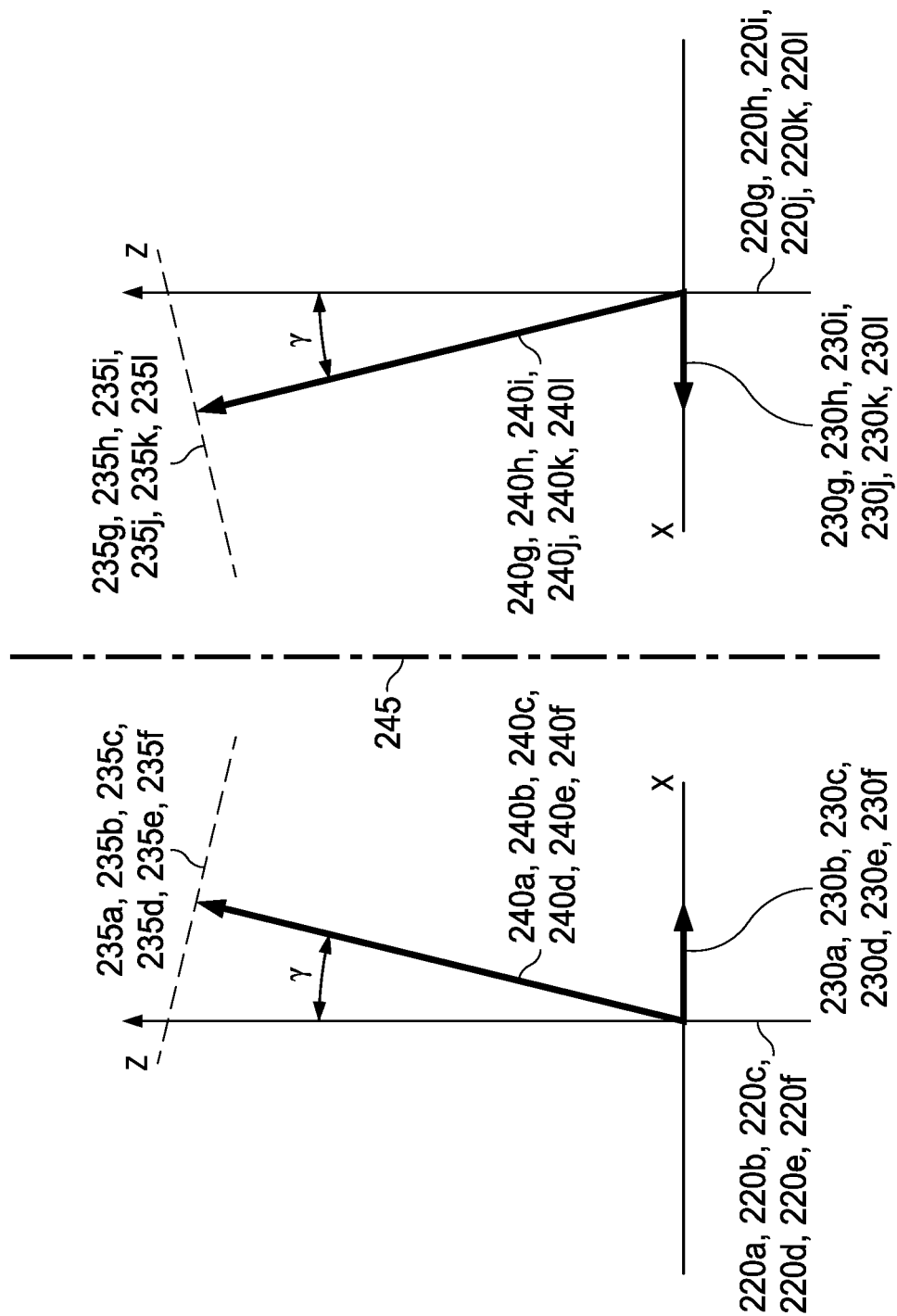
FIG. 2H depicts a tilted rotational axis and tilted plane of rotation of a pair of propellers tilting inwards according to a particular embodiment of the present invention.
Figure 2I:
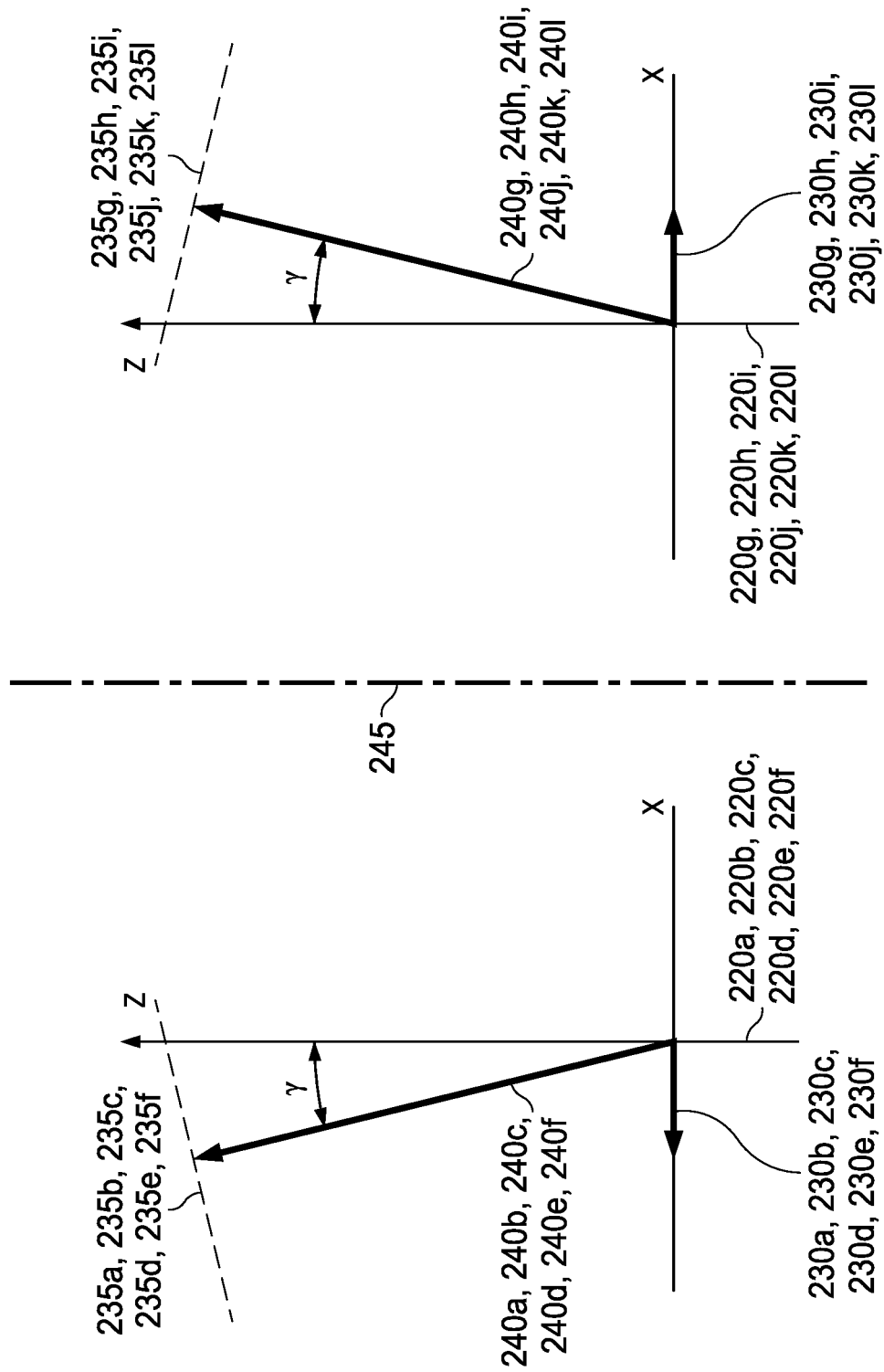
FIG. 2I depicts a tilted rotational axis and tilted plane of rotation of a pair of propellers tilting outwards according to a particular embodiment of the present invention.

Now also referring to FIG. 2H, each propeller 220a through 220l has a rotation direction 225a through 225l indicated by curved arrows (e.g., clockwise or counterclockwise) within a tilted plane of rotation 235a through 235l based on tilt angle γ. The rotation direction 225a, 225c, 225e, 225g, 225i, 225k is clockwise for 50% of the propellers 220a, 220c, 220e, 220g, 220i, 220k and the rotation direction 225b, 225d, 225f, 225h, 225j, 225l is counterclockwise for 50% of the propellers 220b, 220d, 220f, 220h, 220j, 220l. As shown, the rotation direction 225a through 225l of the propellers 220a through 220l disposed along the ring wing 215 alternate between a clockwise direction 225a, 225c, 225e, 225g, 225i, 225k and a counterclockwise direction 225b, 225d, 225f, 225h, 225j, 225l. The tilted plane of rotation 235a through 235l is tilted towards the center of gravity of the aircraft 200 for all of the two or more propellers 220a through 220l (i.e., all tilted inward) such that the X-axis intersects the center 250 of the ring wing 215. Alternatively and as shown in FIG. 2I, all of the propellers 220a through 220l could be tilted outward away from the center of gravity of the aircraft 200 such that the X-axis intersects the center 250 of the ring wing 215. Moreover, a summation of horizontal force vectors 230a through 230l created by the tilted plane of rotation 235a through 235l of all the propellers 220a through 220l is substantially zero when all the propellers 220a through 220l are creating a substantially equal thrust magnitude. The propellers 220a through 220l can be configured in pairs (220a and 220g, 220b and 220h, 220c and 220i, 220d and 220j, 220e and 220k and 220f and 220l), each pair of propellers comprising a first propeller 220a through 220f creating a first thrust having a first horizontal force vector 230a through 230f and a second propeller 220g through 220l creating a second thrust having a second horizontal force vector 230g through 230l, wherein a summation of the first horizontal force vector 230a through 230f and the second horizontal force vector 230g through 230l is substantially zero when the first thrust is substantially equal in magnitude to the second thrust. In one aspect, a summation of horizontal torque vectors (not shown) created by the rotation direction 225a through 225l of all the propellers 220a through 220l is substantially zero when all the propellers 220a through 220l are creating a substantially equal thrust magnitude. The tilt angle γ can be selected from about 1 degree to about 15 degrees depending on the aircraft size, weight and engine/motor distribution. Note that sufficient clearance should be maintained between the propellers 220a through 220l and the support structures 210a, 210b, 210c, 215 and fuselage 205. The first rotational axis 240a through 240f of the first propellers 220a through 220f and the second rotational axis 240g through 240l of the second propellers 220g through 220l are substantially coplanar with respect to a vertical axis 245 disposed between the first propellers 220a through 220f and the second propellers 220g through 220l, which in this example is the center 250 of the ring wing 215. In order to minimize weight and complexity, the propellers 220a through 220l are preferably fixed pitch propellers and the nacelles are preferably fixed. But in some embodiments, it may be desirable to use variable pitch propellers and/or moveable nacelles.

FIG. 2A depicts the aircraft 200 in hover mode in which all the propellers 220a through 220l are operated at a low RPM, which creates low horizontal thrust 230a through 230l. Positioning the propellers 220a through 220l symmetrically around the center of gravity of the aircraft 200 results in the effective cancellation of all horizontal thrust vectors 230a through 230l for a stable hover. Having the horizontal thrust vectors pass radially through the aircraft center of gravity minimizes undesirable coupling of aircraft roll, pitch, and yaw commands. The aircraft 200 can be moved in a vertical direction by increasing or decreasing a thrust of all of the propellers 220a through 220l.

As shown in FIGS. 2B-2G, movement of the aircraft 200 is controlled by selectively increasing or decreasing a thrust of at least one of the propellers 220a through 220l. The movement can be a lateral motion, a longitudinal motion or a combination thereof without rolling and/or pitching the aircraft 200. The movement may also be a pitch, a roll, a yaw, a translation or a combination thereof. The tilted distributed propulsion system moves the aircraft with a control lag that is less than that of a non-tilted distributed propulsion system. As a result, the present invention provides a control authority that is greater than that of a non-tilted distributed propulsion system. This is achieved without the need to add excessive power margin. Those skilled in the art will understand and appreciate that the differences in control lag and control authority between tilted distributed propulsion systems and non-tilted distributed propulsion systems will vary depending to the aircraft design and distributed propulsion system, but that such terms are understandable and not indefinite based on the teachings herein.

FIG. 2B depicts the aircraft 200 in a left yaw 255. The rotational speeds of all of the propellers 220a, 220c, 220e, 220g, 220i, 220k that rotate in a clockwise direction 225a, 225c, 225e, 225g, 225i, 225k are increased. A summation of horizontal force vectors 230a through 230l created by the tilted plane of rotation 235a through 235l of all the propellers 220a through 220l is substantially zero even though all the propellers 220a through 220l are not creating a substantially equal thrust magnitude. The thrust for each pair (220a and 220g, 220b and 220h, 220c and 220i, 220d and 220j, 220e and 220k and 220f and 220l) is substantially equal in magnitude and opposite in direction such that they cancel each other out. But, operating the clockwise rotating propellers 220a, 220c, 220e, 220g, 220i, 220k at a faster RPM than the counterclockwise rotating propellers 220b, 220d, 220f, 220h, 220j, 220l creates a differential torque to yaw the aircraft 200 counterclockwise, or left 255.

FIG. 2C depicts the aircraft 200 in a right yaw 260. The rotational speeds of all of the propellers 220b, 220d, 220f, 220h, 220j, 220l that rotate in a counterclockwise direction 225b, 225d, 225f, 225h, 225j, 225l are increased. A summation of horizontal force vectors 230a through 230l created by the tilted plane of rotation 235a through 235l of all the propellers 220a through 220l is substantially zero even though all the propellers 220a through 220l are not creating a substantially equal thrust magnitude. The thrust for each pair (220a and 220g, 220b and 220h, 220c and 220i, 220d and 220j, 220e and 220k and 220f and 220l) is substantially equal in magnitude and opposite in direction such that they cancel each other out. But, operating the counterclockwise rotating propellers 220b, 220d, 220f, 220h, 220j, 220l at a faster RPM than the clockwise rotating propellers 220a, 220c, 220e, 220g, 220i, 220k creates a differential torque to yaw the aircraft 200 clockwise, or right 260.

FIG. 2D depicts the aircraft 200 pitching forward and translating forward 265. The rotational speeds of propellers 220e, 220f, 220g, 220h, 220i aft of center of gravity centerline 252 are increased. Operating propellers 220e, 220f, 220g, 220h, 220i aft of center of gravity centerline 252 at a faster RPM than propellers 220a, 220b, 220c, 220d, 220j, 220k, 220l creates an immediate forward differential thrust to pitch and translate the aircraft 200 forward 265, which minimizes control lag.

FIG. 2E depicts the aircraft 200 pitching aft and translating aft 270. The rotational speeds of propellers 220a, 220b, 220c, 220k, 220l forward of center of gravity centerline 252 are increased. Operating propellers 220a, 220b, 220c, 220k, 220l forward of center of gravity centerline 252 at a faster RPM than propellers 220d, 220e, 220f, 220g, 220h, 220i, 220j creates an immediate aft differential thrust to pitch and translate the aircraft 200 aft 270, which minimizes control lag.

FIG. 2F depicts the aircraft 200 rolling left and translating left 275. The rotational speeds of propellers 220b, 220c, 220d, 220e, 220f to the right of center of gravity centerline 254 are increased. Operating propellers 220b, 220c, 220d, 220e, 220f to the right of center of gravity centerline 254 at a faster RPM than 220a, 220g, 220h, 220i, 220j, 220k, 220l creates an immediate left lateral differential thrust to roll and translate the aircraft 200 left 275, which minimizes control lag.

FIG. 2G depicts the aircraft 200 rolling right and translating right 280. The rotational speeds of propellers 220h, 220i, 220j, 220k, 220l to the left of center of gravity centerline 254 are increased. Operating propellers 220h, 220i, 220j, 220k, 220l to the left of center of gravity centerline 254 at a faster RPM than propellers 220a, 220b, 220c, 220d, 220e, 220f, 220g creates an immediate right lateral differential thrust to roll and translate the aircraft 200 right 280, which minimizes control lag.

FIGS. 3A-3K depict a plan view of an aircraft 300 with distributed propulsion in various flight modes according to a second embodiment of the present invention. Aircraft 300 includes a fuselage 305, one or more support structures (e.g., spokes 310a, 310b, 310c, and closed or ring wing 315) connected to the fuselage 305, and one or more engines or motors (not shown) disposed within or attached to the one or more support structures (e.g., spokes 310a, 310b, 310c, and closed or ring wing 315) or the fuselage 305. The distributed propulsion system includes two or more propellers (e.g., propellers 320a through 320l) symmetrically distributed in an array along the one or more support structures (e.g., closed or ring wing 315) with respect to a center of gravity of the aircraft 300 and operably connected to the one or more engines or motors.

Figure 3A:
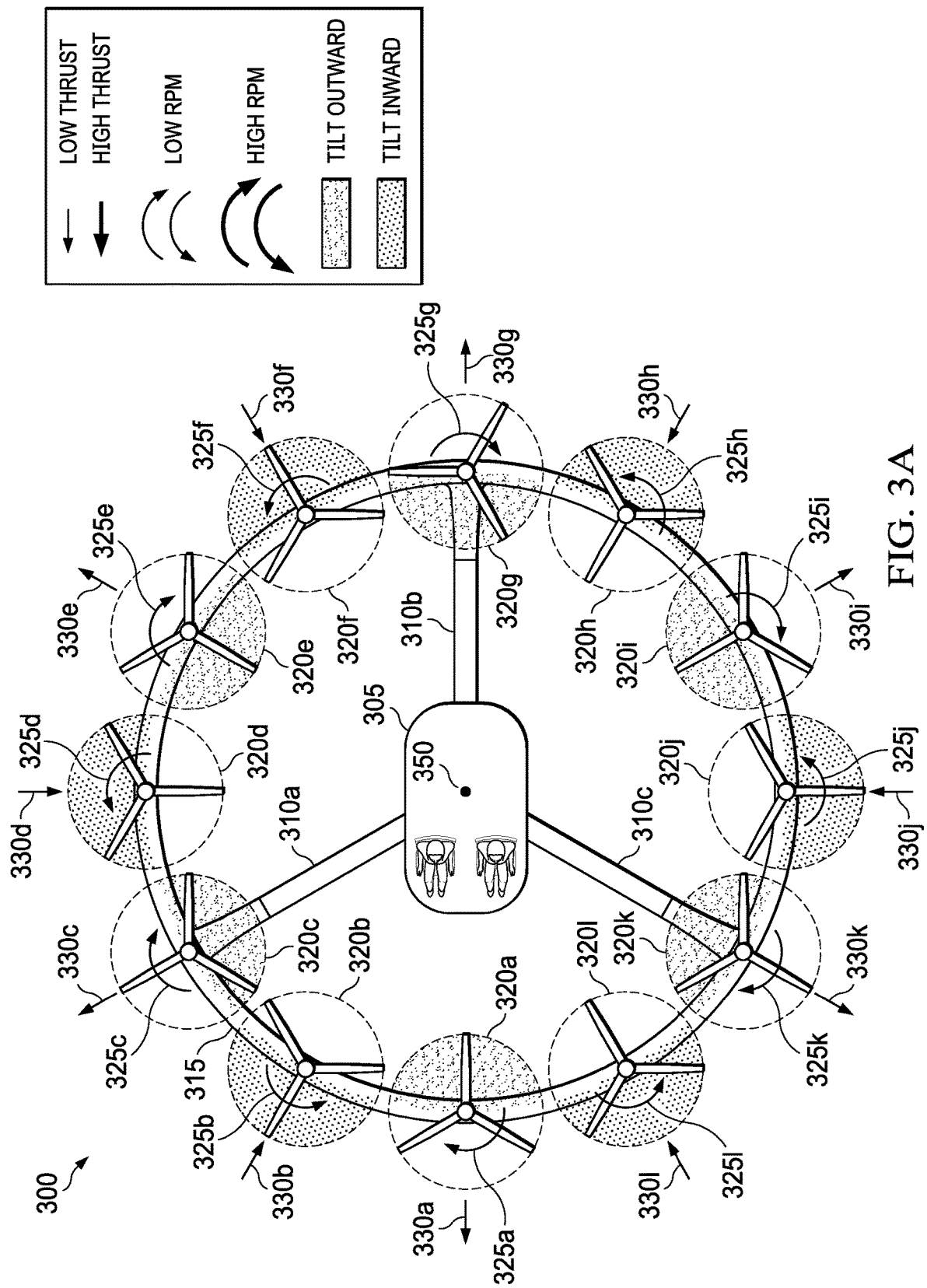
FIG. 3A depicts a plan view of an aircraft with distributed propulsion in hover mode according to a second embodiment of the present invention.
Figure 3B:
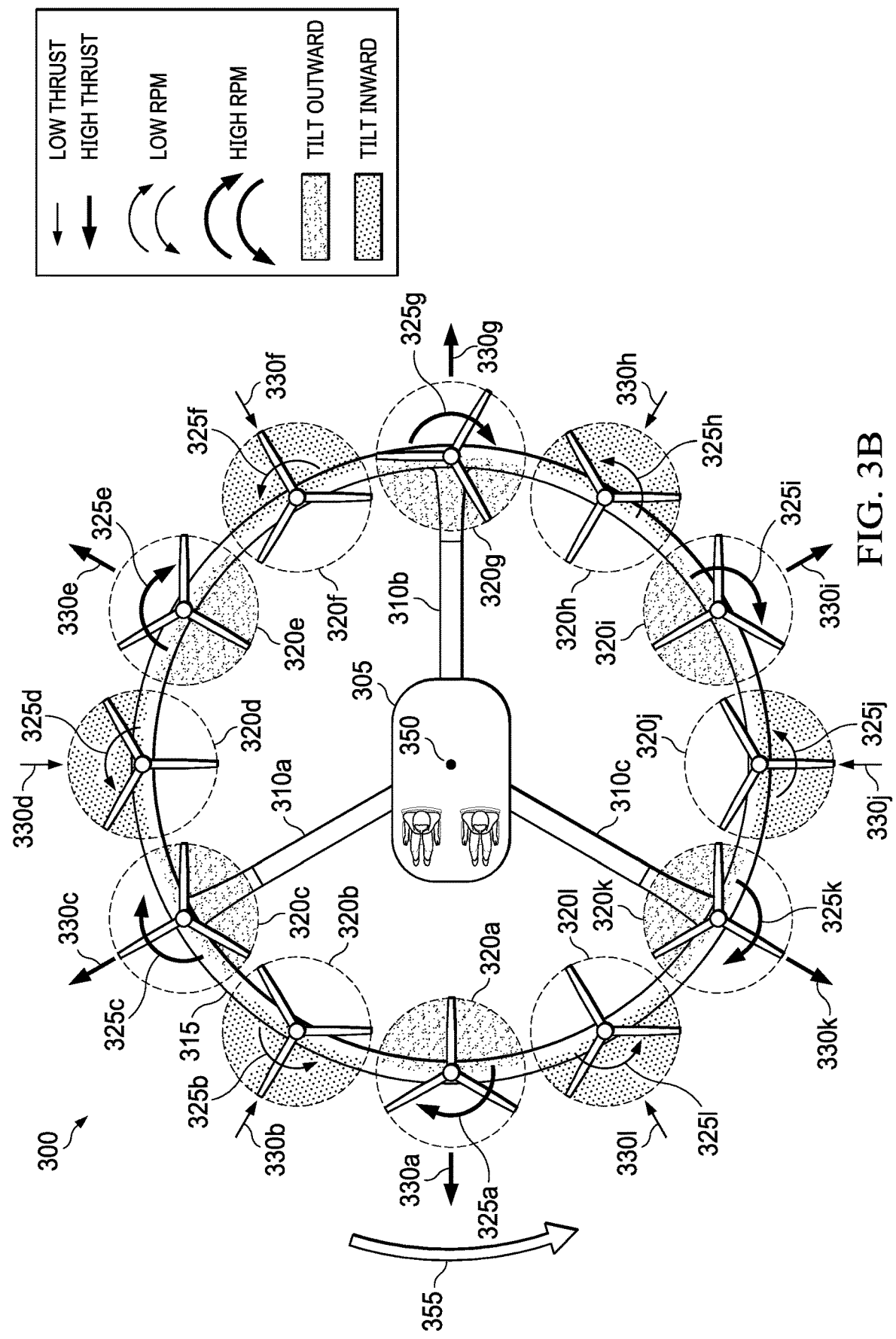
FIG. 3B depicts a plan view of an aircraft with distributed propulsion in a left yaw according to a second embodiment of the present invention.
Figure 3C:
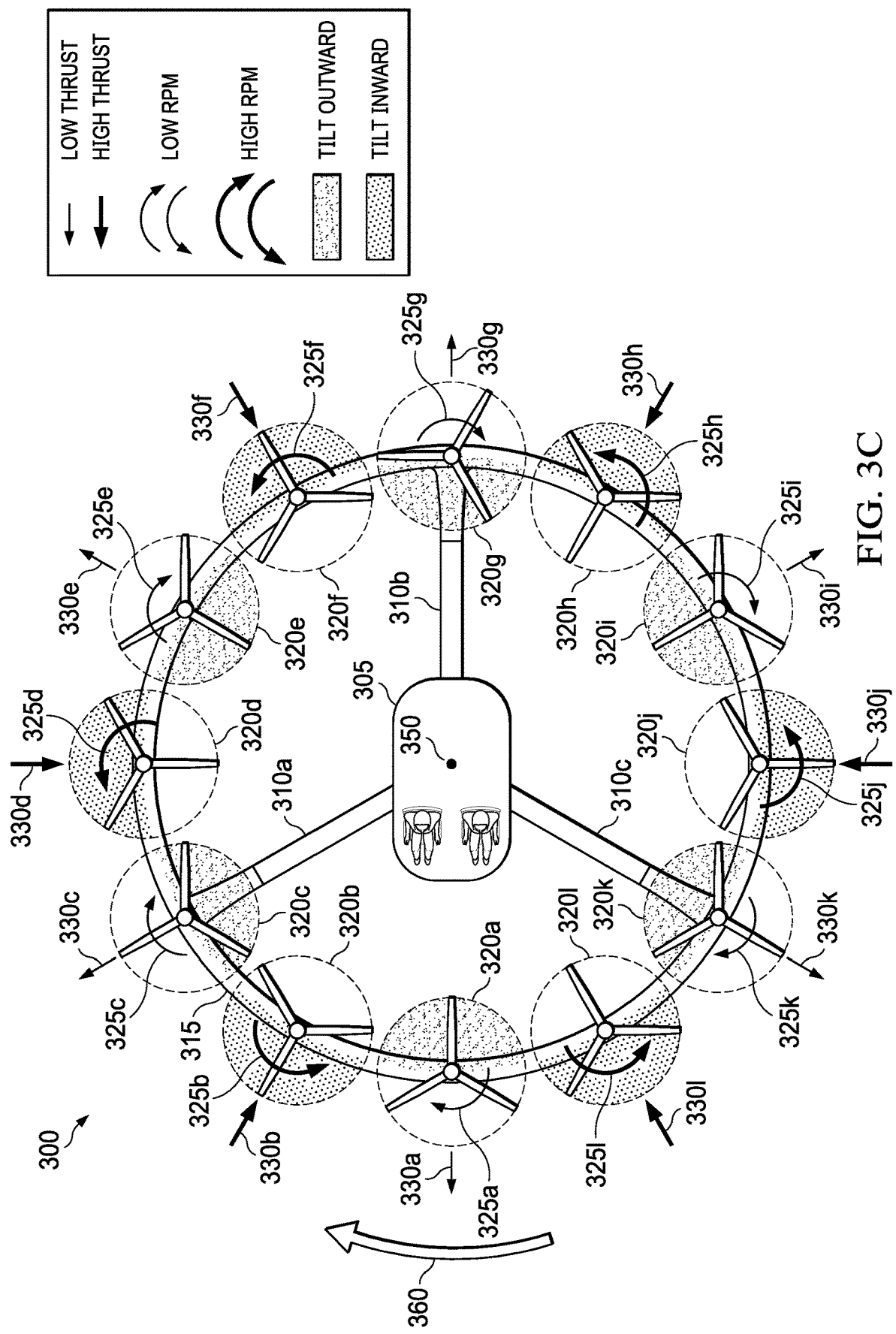
FIG. 3C depicts a plan view of an aircraft with distributed propulsion in a right yaw according to a second embodiment of the present invention.
Figure 3D:
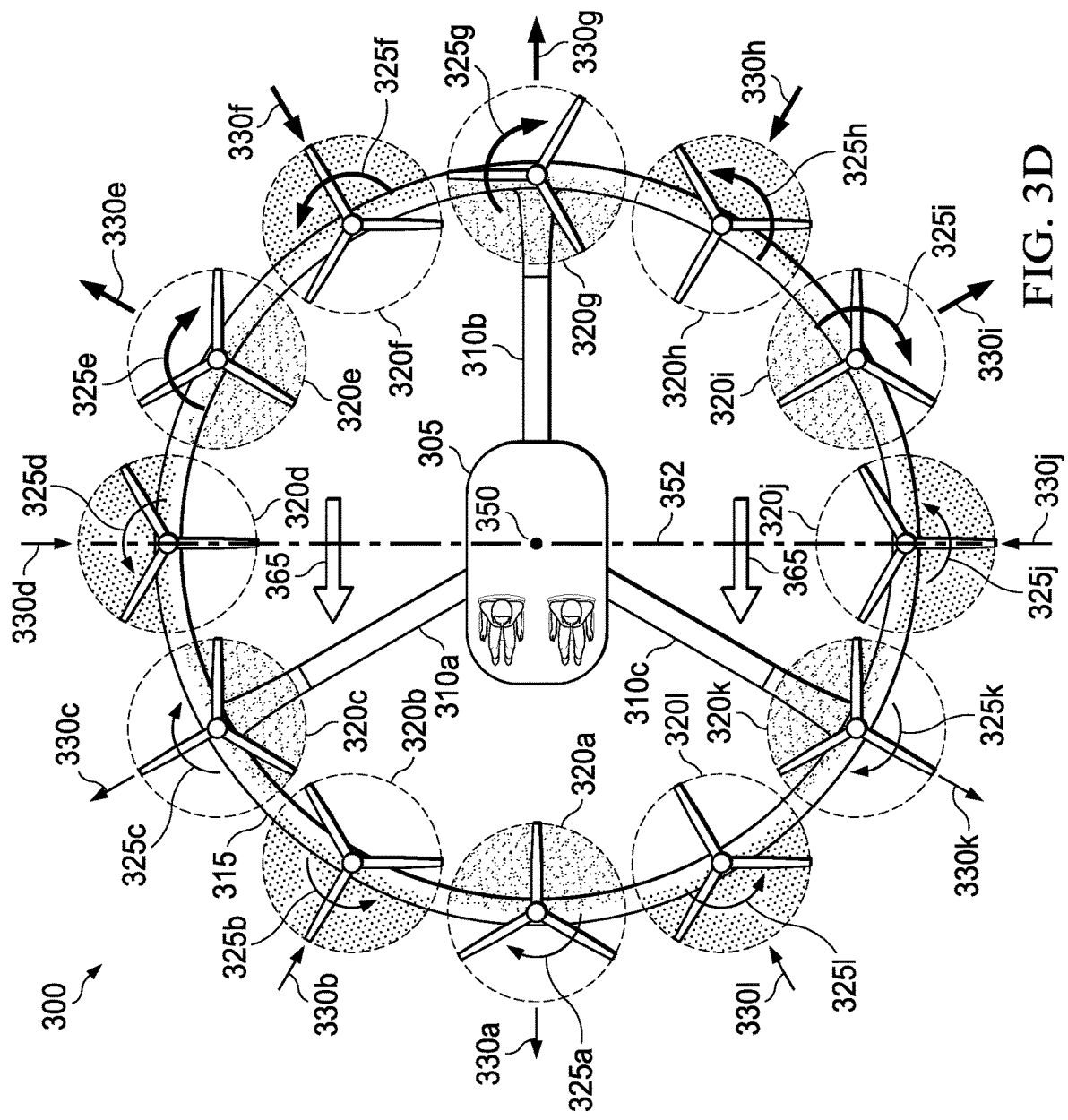
FIG. 3D depicts a plan view of an aircraft with distributed propulsion pitching forward and translating forward according to a second embodiment of the present invention.
Figure 3E:
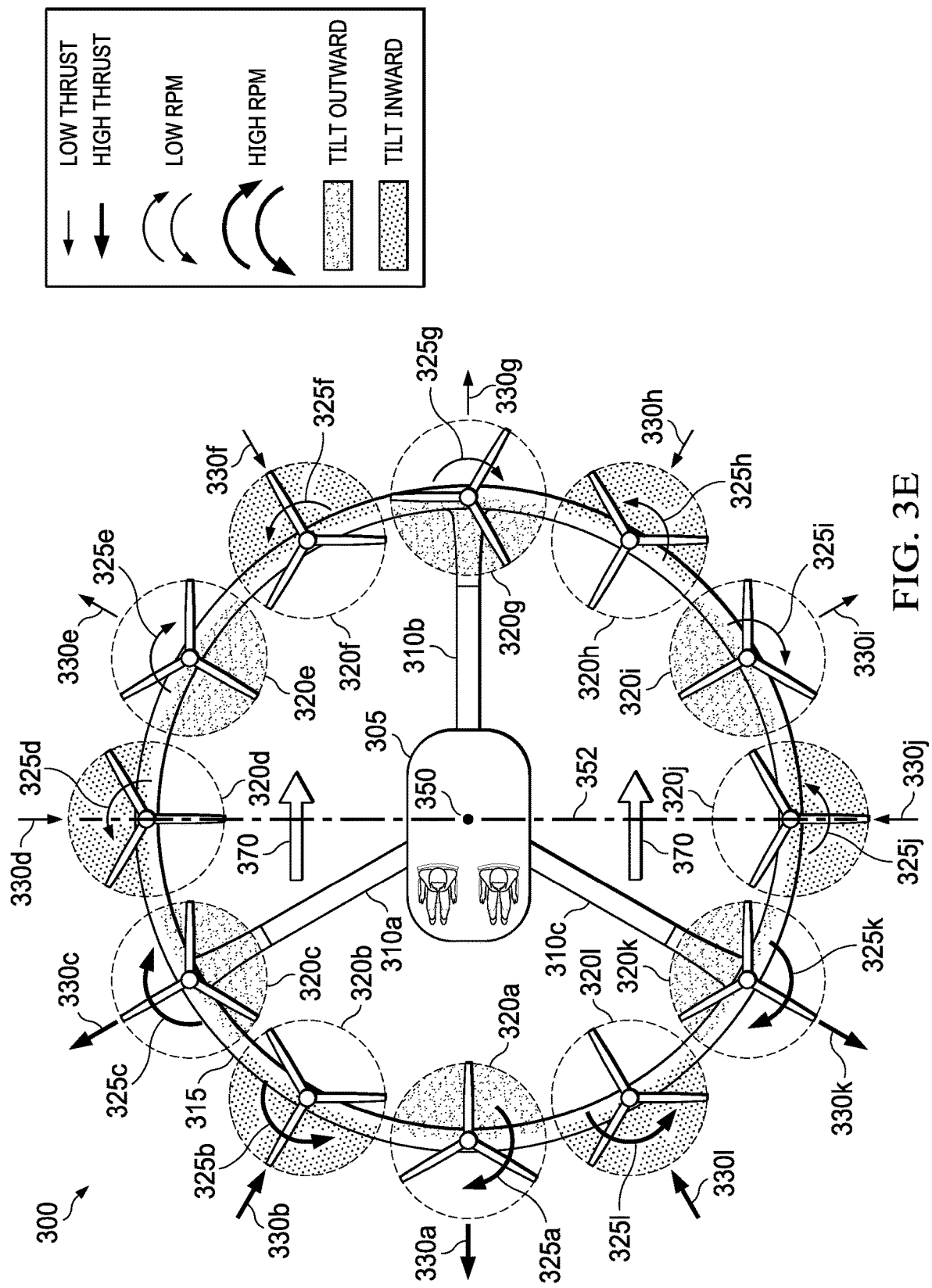
FIG. 3E depicts a plan view of an aircraft with distributed propulsion pitching aft and translating aft according to a second embodiment of the present invention.
Figure 3F:
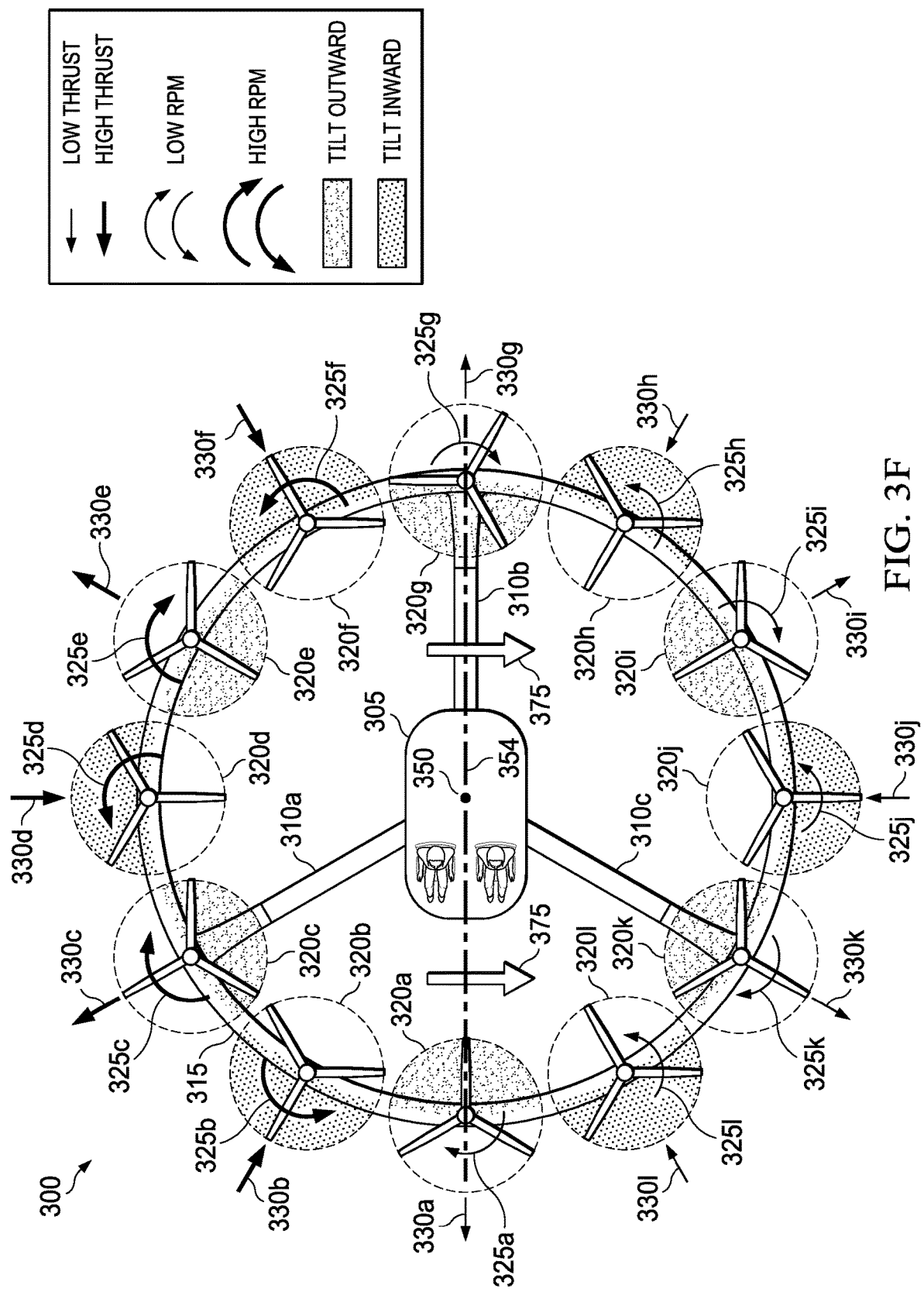
FIG. 3F depicts a plan view of an aircraft with distributed propulsion rolling left and translating left according to a second embodiment of the present invention.
Figure 3G:
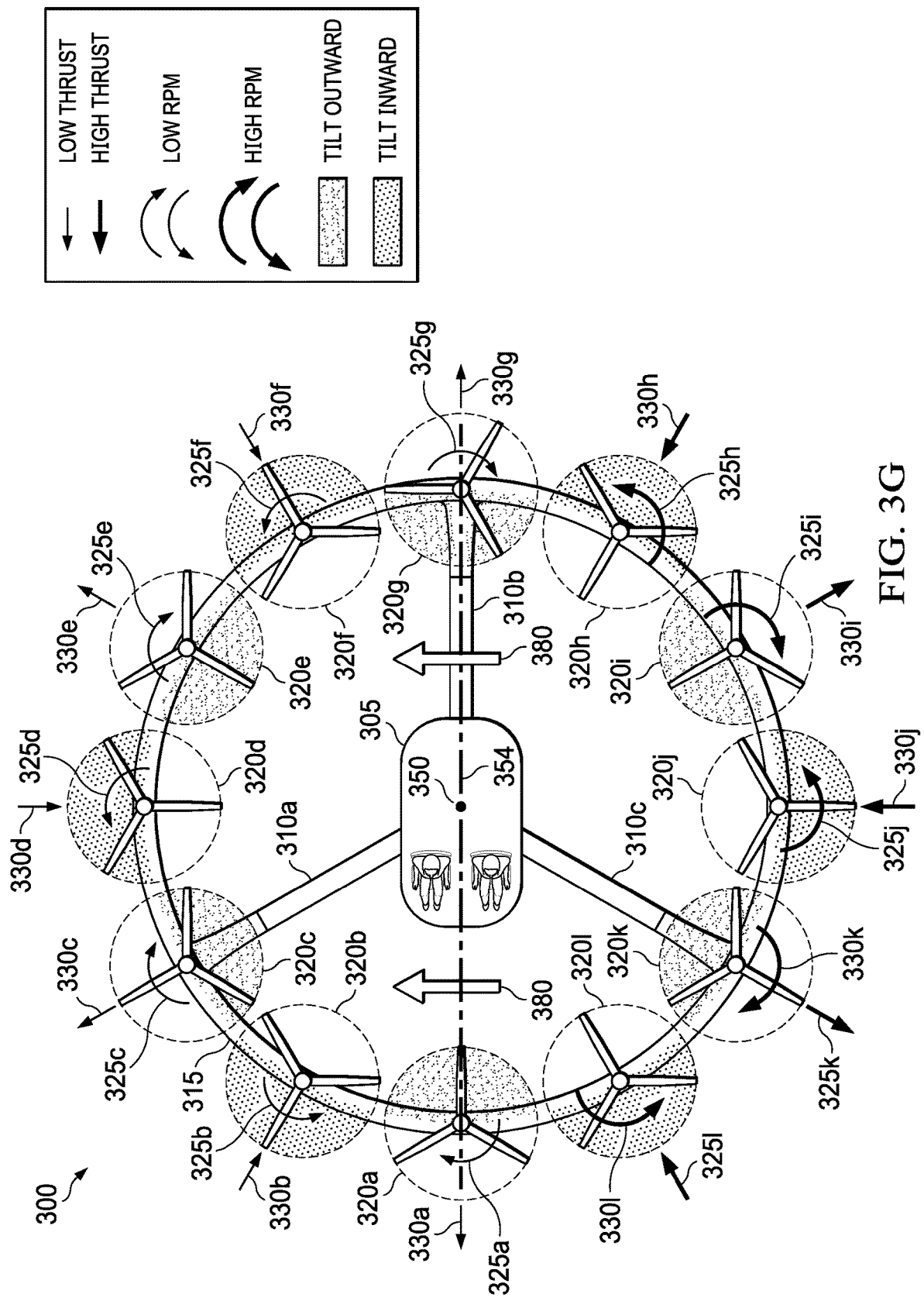
FIG. 3G depicts a plan view of an aircraft with distributed propulsion rolling right and translating right according to a second embodiment of the present invention.
Figure 3H:
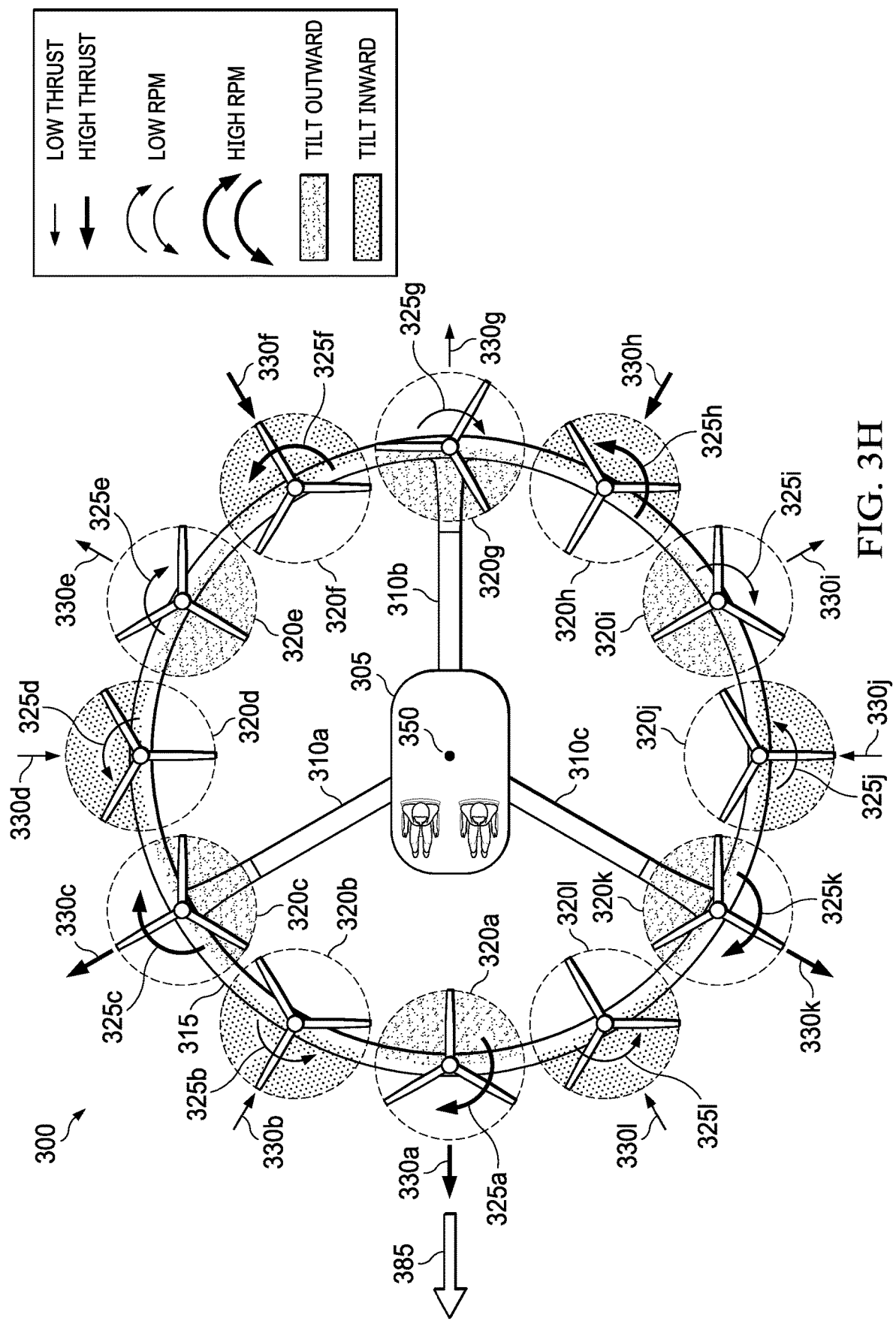
FIG. 3H depicts a plan view of an aircraft with distributed propulsion translating forward according to a third embodiment of the present invention.
Figure 3I:
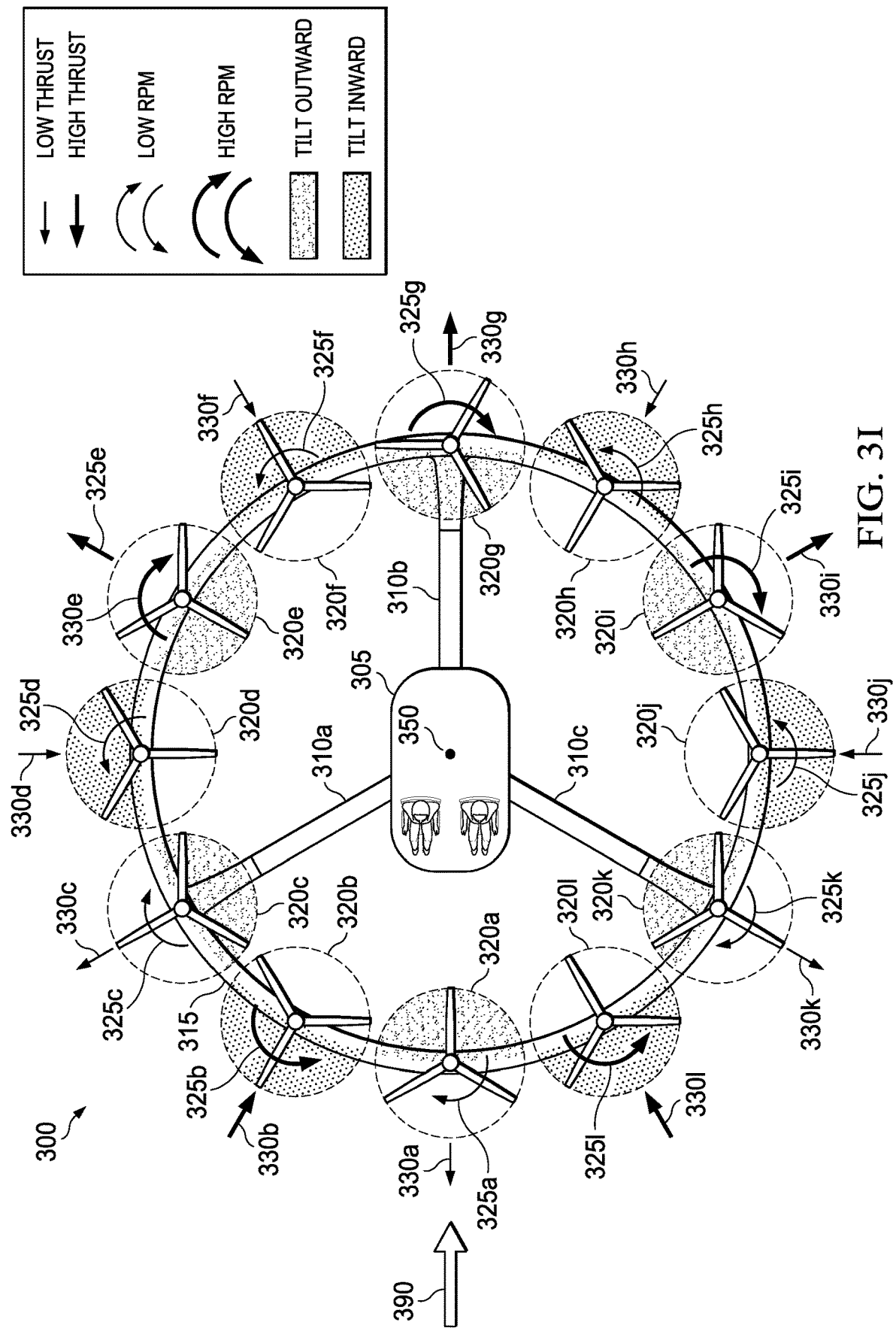
FIG. 3I depicts a plan view of an aircraft with distributed propulsion translating aft according to a second embodiment of the present invention.
Figure 3J:
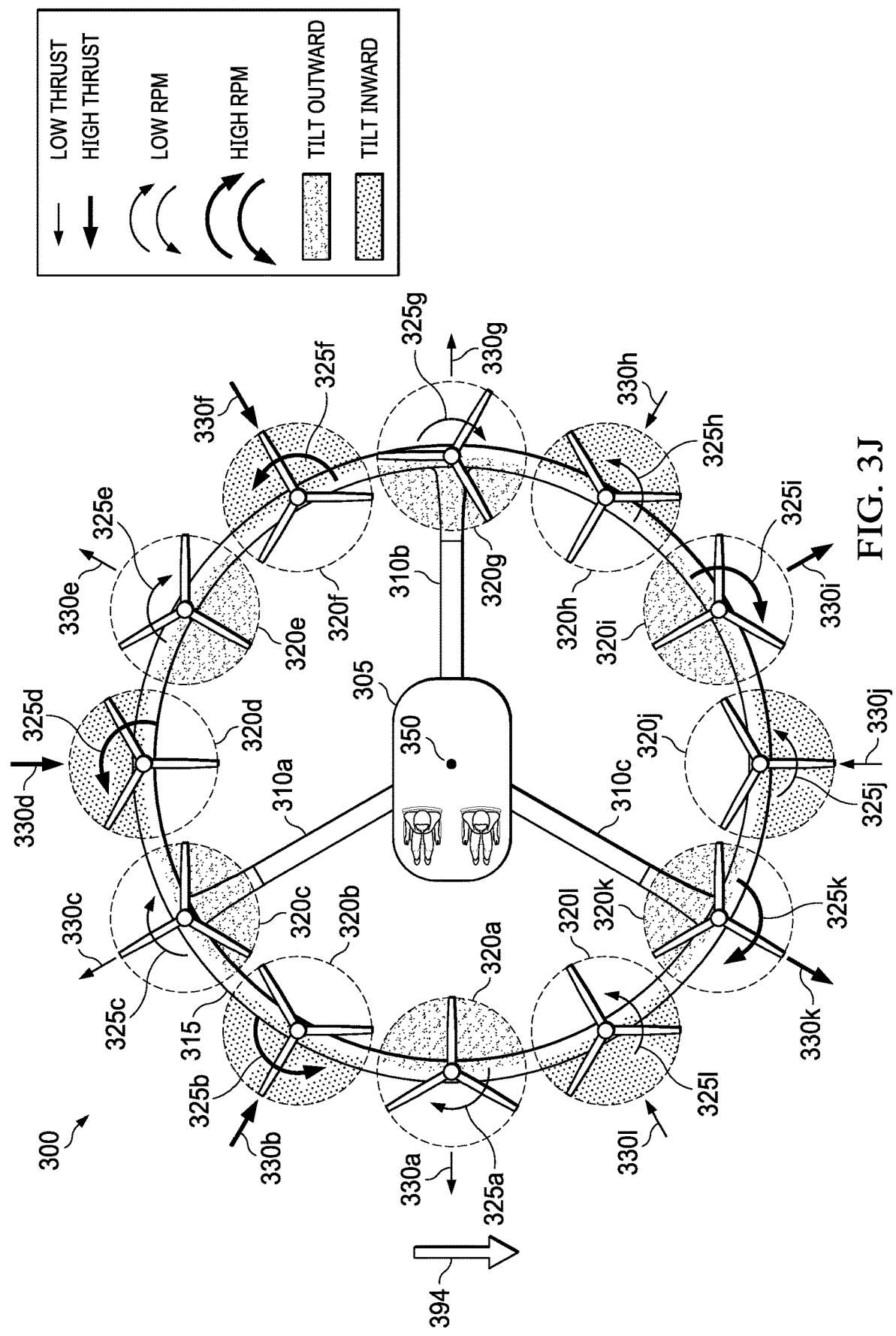
FIG. 3J depicts a plan view of an aircraft with distributed propulsion translating left according to a second embodiment of the present invention.
Figure 3K:
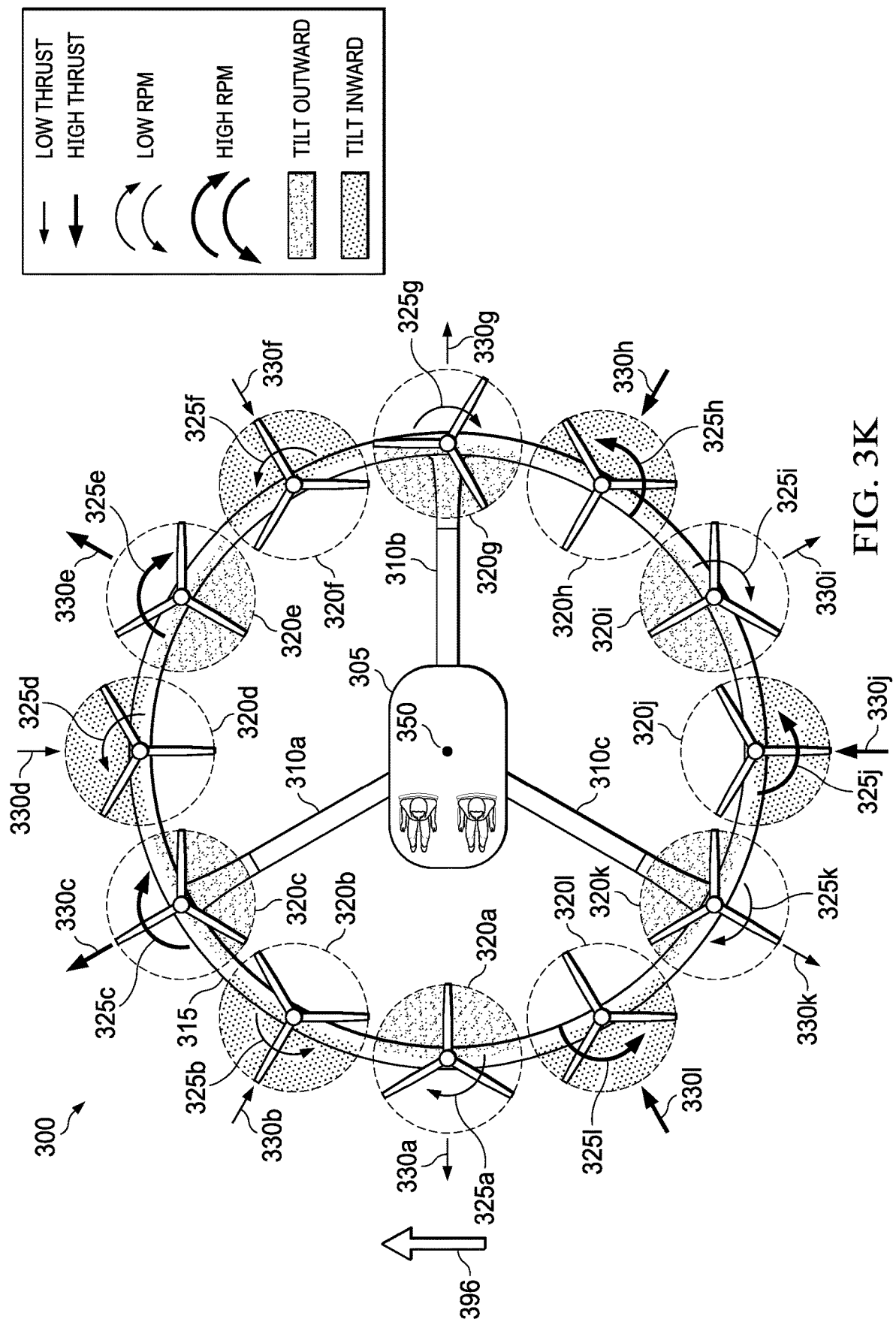
FIG. 3K depicts a plan view of an aircraft with distributed propulsion translating right according to a second embodiment of the present invention.
Figure 3L:
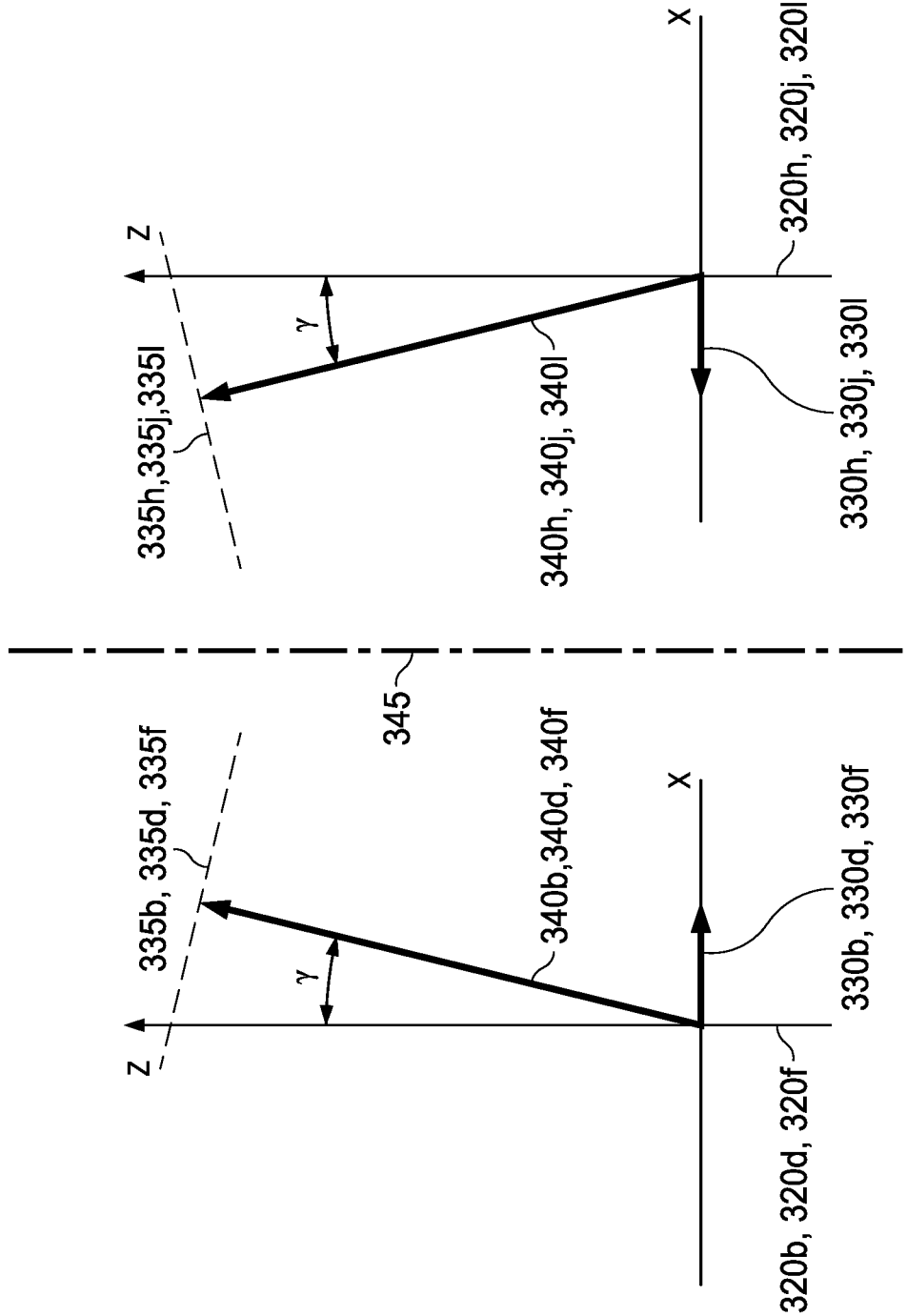
FIG. 3L depicts a tilted rotational axis and tilted plane of rotation of a pair of propellers tilting inwards according to a second embodiment of the present invention.
Figure 3M:
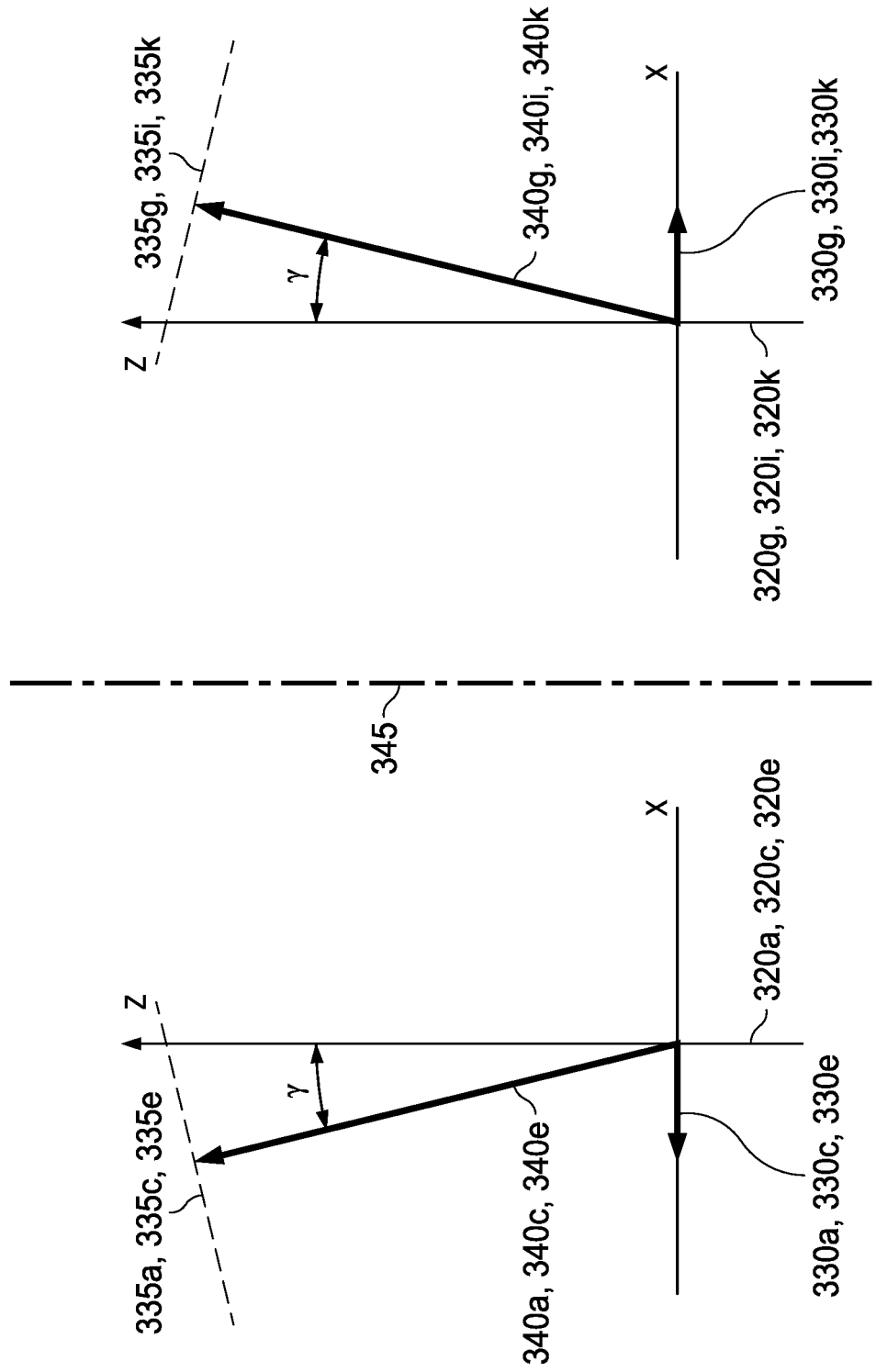
FIG. 3M depicts a tilted rotational axis and tilted plane of rotation of a pair of propellers tilting outwards according to a second embodiment of the present invention.

Now also referring to FIG. 3L-3M, each propeller 320a through 320l has a rotation direction indicated by curved arrows 325a through 325l (e.g., clockwise or counterclockwise) within a tilted plane of rotation 335a through 335l based on tilt angle γ. The rotation direction 325a, 325c, 325e, 325g, 325i, 325k is clockwise for 50% of the propellers 320a, 320c, 320e, 320g, 320i, 320k and the rotation direction 325b, 325d, 325f, 325h, 325j, 325l is counterclockwise for 50% of the propellers 320b, 320d, 320f, 320h, 320j, 320l. As shown, the rotation direction 325a through 325l of the propellers 320a through 320l disposed along the ring wing 315 alternate between a clockwise direction 325a, 325c, 325e, 325g, 325i, 325k and a counterclockwise direction 325b, 325d, 325f, 325h, 325j, 325l. The tilted plane of rotation 335b, 335d, 335f, 335h, 335j, 335l is tilted towards the center of gravity of the aircraft 300 for 50% of the two or more propellers 320b, 320d, 320f, 320h, 320j, 320l (i.e., all tilted inward) such that the X-axis intersects the center 350 of the ring wing 315, and the tilted plane of rotation 335a, 335c, 335e, 335g, 335i, 335k is tilted outwards away from the center of gravity of the aircraft 300 for 50% of the two or more propellers 320a, 320c, 320e, 320g, 320i, 320k (i.e., all tilted outward) such that the X-axis intersects the center 350 of the ring wing 315. The direction of tilting of the propellers 320a through 320l disposed along the ring wing 315 alternate between tilting inwards and tilting outwards. Moreover, a summation of horizontal force vectors 330a through 330l created by the tilted plane of rotation 335a through 335l of all the propellers 320a through 320l is substantially zero when all the propellers 320a through 320l are creating a substantially equal thrust magnitude. The propellers 320a through 320l can be configured in pairs (320a and 320g, 320b and 320h, 320c and 320i, 320d and 320j, 320e and 320k and 320f and 320l), each pair of propellers comprising a first propeller 320a through 320f creating a first thrust having a first horizontal force vector 330a through 330f and a second propeller 320g through 320l creating a second thrust having a second horizontal force vector 330g through 330l, wherein a summation of the first horizontal force vector 330a through 330f and the second horizontal force vector 330g through 330l is substantially zero when the first thrust is substantially equal in magnitude to the second thrust. In one aspect, a summation of horizontal torque vectors (not shown) created by the rotation direction 325a through 325l of all the propellers 320a through 320l is substantially zero when all the propellers 320a through 320l are creating a substantially equal thrust magnitude. The tilt angle γ can be selected from about 1 degree to about 15 degrees depending on the aircraft size, weight and engine/motor distribution. Note that sufficient clearance should be maintained between the propellers 320a through 320l and the support structures 310a, 310b, 310c, 315 and fuselage 305. As shown in FIG. 3L for the inboard tilted propellers, the first rotational axis 340b, 340d, 340f of the first propellers 320b, 320d, 320f and the second rotational axis 340h, 340j, 340lf of the second propellers 320h, 320j, 320f are substantially coplanar with respect to a vertical axis 345 disposed between the first propellers 320b, 320d, 320f and the second propellers 310h, 310j, 310f, which in this example is the center 350 of the ring wing 315. As shown in FIG. 3M for the outward tilted propellers, the first rotational axis 340a, 340c, 340e of the first propellers 320a, 320c, 320e and the second rotational axis 340g, 340i, 340k of the second propellers 320g, 320i, 320k are substantially coplanar with respect to a vertical axis 345 disposed between the first propellers 320a, 320c, 320e and the second propellers 320g, 320i, 320k, which in this example is the center 350 of the ring wing 315. In order to minimize weight and complexity, the propellers 320a through 320l are preferably fixed pitch propellers and the nacelles are preferably fixed. But in some embodiments, it may be desirable to use variable pitch propellers and/or moveable nacelles.

FIG. 3A depicts the aircraft 300 in hover mode in which all the propellers 320a through 320l are operated at a low RPM, which creates low horizontal thrust 330a through 330l. Positioning the propellers 320a through 320l symmetrically around the center of gravity of the aircraft 300 results in the effective cancellation of all horizontal thrust vectors 330a through 330l for a stable hover. Alternating the inboard and outboard tilting of the propellers 320a through 320l provides for lateral and longitudinal directional control of the aircraft 300 completely independent of aircraft pitch and roll. Having the horizontal thrust vectors pass radially through the aircraft center of gravity minimizes undesirable coupling of aircraft roll, pitch, and yaw commands. This capability enhances aircraft directional control by eliminating the effect of the rotational inertia of aircraft 300 from lateral and longitudinal control. The aircraft 300 can be moved in a vertical direction by increasing or decreasing a thrust of all of the propellers 320a through 320l.

As shown in FIGS. 3B-3K, movement of the aircraft 300 is controlled by selectively increasing or decreasing a thrust of at least one of the propellers 320a through 320l. The movement can be a lateral motion, a longitudinal motion or a combination thereof without rolling and/or pitching the aircraft 300. The movement may also be a pitch, a roll, a yaw, a translation or a combination thereof. The tilted distributed propulsion system moves the aircraft with a control lag that is less than that of a non-tilted distributed propulsion system. As a result, the present invention provides a control authority that is greater than that of a non-tilted distributed propulsion system. This is achieved without the need to add excessive power margin. Those skilled in the art will understand and appreciate that the differences in control lag and control authority between tilted distributed propulsion systems and non-tilted distributed propulsion systems will vary depending to the aircraft design and distributed propulsion system, but that such terms are understandable and not indefinite based on the teachings herein.

FIG. 3B depicts the aircraft 300 in a left yaw 355. The rotational speeds of all of the propellers 320a, 320c, 320e, 320g, 320i, 320k that rotate in a clockwise direction 325a, 325c, 325e, 325g, 325i, 325k are increased. A summation of horizontal force vectors 330a through 330l created by the tilted plane of rotation 335a through 335l of all the propellers 320a through 320l is substantially zero even though all the propellers 320a through 320l are not creating a substantially equal thrust magnitude. The thrust for each pair (320a and 320g, 320b and 320h, 320c and 320i, 320d and 320j, 320e and 320k and 320f and 320l) is substantially equal in magnitude and opposite in direction such that they cancel each other out. But, operating the clockwise rotating propellers 320a, 320c, 320e, 320g, 320i, 320k at a faster RPM than the counterclockwise rotating propellers 320b, 320d, 320f, 320h, 320j, 320l creates a differential torque to yaw the aircraft 300 counterclockwise, or left 355.

FIG. 3C depicts the aircraft 300 in a right yaw 360. The rotational speeds of all of the propellers 320b, 320d, 320f, 320h, 320j, 320l that rotate in a counterclockwise direction 325b, 325d, 325f, 325h, 325j, 325l are increased. A summation of horizontal force vectors 330a through 330l created by the tilted plane of rotation 335a through 335l of all the propellers 320a through 320l is substantially zero even though all the propellers 320a through 320l are not creating a substantially equal thrust magnitude. The thrust for each pair (320a and 320g, 320b and 320h, 320c and 320i, 320d and 320j, 320e and 320k and 320f and 320l) is substantially equal in magnitude and opposite in direction such that they cancel each other out. But, operating the counterclockwise rotating propellers 320b, 320d, 320f, 320h, 320j, 320l at a faster RPM than the clockwise rotating propellers 320a, 320c, 320e, 320g, 320i, 320k creates a differential torque to yaw the aircraft 300 clockwise, or right 360.

FIG. 3D depicts the aircraft 300 pitching forward 365. The rotational speeds of propellers 320e, 320f, 320g, 320h, 320i aft of center of gravity centerline 252 are increased. Operating propellers 320e, 320f, 320g, 320h, 320i aft of center of gravity centerline 252 at a faster RPM than propellers 320a, 320b, 320c, 320d, 320j, 320k, 320l creates an immediate forward differential thrust that lifts the aft part of the aircraft 300 to pitch the aircraft 300 forward 365, which minimizes control lag. The sum of the longitudinal thrust vectors can cancel any resulting forward motion.

FIG. 3E depicts the aircraft 300 pitching aft 370. The rotational speeds of propellers 320a, 320b, 320c, 320k, 320l forward of center of gravity centerline 352 are increased. Operating propellers 320a, 320b, 320c, 320k, 320l forward of center of gravity centerline 352 at a faster RPM than propellers 320d, 320e, 320f, 320g, 320h, 320i, 320j creates an immediate aft differential thrust that lifts the forward part of the aircraft 300 to pitch the aircraft 300 aft 370, which minimizes control lag. The sum of the longitudinal thrust vectors can cancel any resulting forward motion.

FIG. 3F depicts the aircraft 300 rolling left 375. The rotational speeds of propellers 320b, 320c, 320d, 320e, 320f to the right of center of gravity centerline 354 are increased. Operating propellers 320b, 320c, 320d, 320e, 320f to the right of center of gravity centerline 354 at a faster RPM than propellers 320a, 320g, 320h, 320i, 320j, 320k, 320l creates an immediate left lateral differential thrust that lifts the right part of the aircraft 300 to roll the aircraft 300 left 375, which minimizes control lag. The sum of the lateral thrust vectors can cancel any resulting left lateral motion.

FIG. 3G depicts the aircraft 300 rolling right 380. The rotational speeds of propellers 320h, 320i, 320j, 320k, 320l to the left of center of gravity centerline 354 are increased. Operating propellers 320h, 320i, 320j, 320k, 320l to the right of center of gravity centerline 354 at a faster RPM than propellers 320a, 320b, 320c, 320d, 320e, 320f, 320g creates an immediate right lateral differential thrust that lifts the left part of the aircraft 300 to roll the aircraft 300 right 380, which minimizes control lag. The sum of the lateral thrust vectors can cancel any resulting right lateral motion.

FIG. 3H depicts the aircraft 300 translating forward 385. The rotational speeds of the propellers 320a, 320c, 320f, 320h, 320k are increased. Operating the propellers 320a, 320c, 320f, 320h, 320k at a faster RPM than propellers 320b, 320d, 320e, 320g, 320i, 320j, 320l creates an immediate forward acting differential thrust that translates the aircraft 300 forward 385, which minimizes control lag. The sum of the forward and aft pitch moments can cancel any resulting forward pitching motion.

FIG. 3I depicts the aircraft 300 translating aft 390. The rotational speeds of the propellers 320b, 320e, 320g, 320i, 320i are increased. Operating the propellers 320b, 320e, 320g, 320i, 320i at a faster RPM than propellers 320a, 320c, 320d, 320f, 320h, 320j, 320k creates an immediate aft acting differential thrust that translates the aircraft 300 aft 390, which minimizes control lag. The sum of the forward and aft pitch moments can cancel any resulting aft pitching motion.

FIG. 3J depicts the aircraft 300 translating left 394. The rotational speeds of the propellers 320b, 320d, 320f, 320i, 320k are increased. Operating the propellers 320b, 320d, 320f, 320i, 320k at a faster RPM than propellers 320a, 320c, 320e, 320g, 320h, 320j, 320l creates an immediate left acting differential thrust that translates the aircraft 300 left 394, which minimizes control lag. The sum of the left and right roll moments can cancel any resulting left rolling motion.

FIG. 3K depicts the aircraft 300 translating right 396. The rotational speeds of the propellers 320c, 320e, 320h, 320j, 320l are increased. Operating the propellers 320c, 320e, 320h, 320j, 320l at a faster RPM than propellers 320a, 320b, 320d, 320f, 320g, 320i, 320k creates an immediate right acting differential thrust that translates the aircraft 300 right 396, which minimizes control lag. The sum of the left and right roll moments can cancel any resulting right rolling motion.

FIGS. 4A-4K depict a plan view of an aircraft 400 with distributed propulsion in various flight modes according to a third embodiment of the present invention. Aircraft 400 includes a fuselage 405, one or more support structures (e.g., spokes 410a, 410b, 410c, and closed or ring wing 415) connected to the fuselage 405, and one or more engines or motors (not shown) disposed within or attached to the one or more support structures (e.g., spokes 410a, 410b, 410c, and closed or ring wing 415) or the fuselage 405. The distributed propulsion system includes two or more propellers (e.g., propellers 420a through 420l) symmetrically distributed in an array along the one or more support structures (e.g., closed or ring wing 415) with respect to a center of gravity of the aircraft 400 and operably connected to the one or more engines or motors.

Figure 4A:
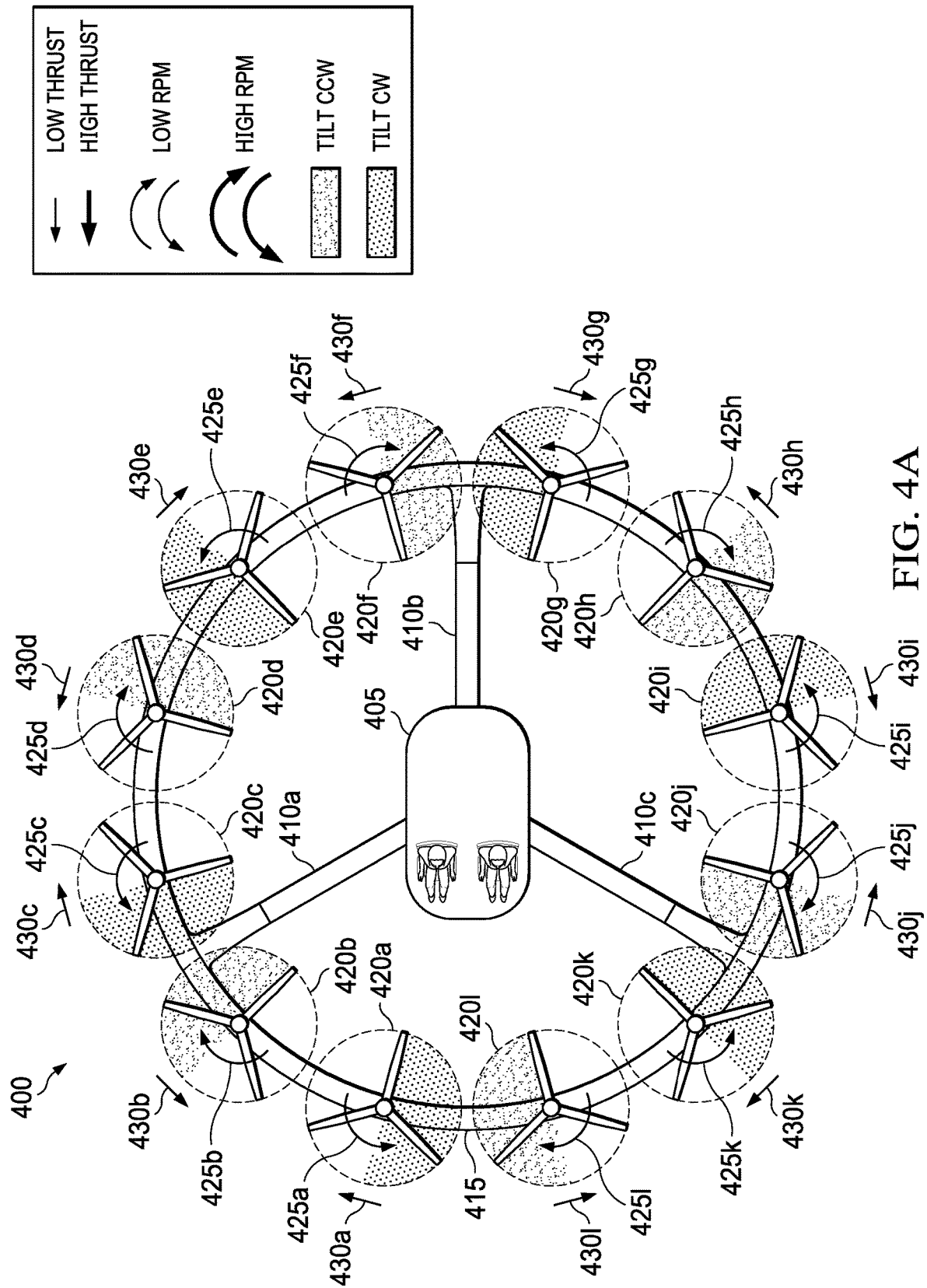
FIG. 4A depicts a plan view of an aircraft with distributed propulsion in hover mode according to a third embodiment of the present invention.
Figure 4B:
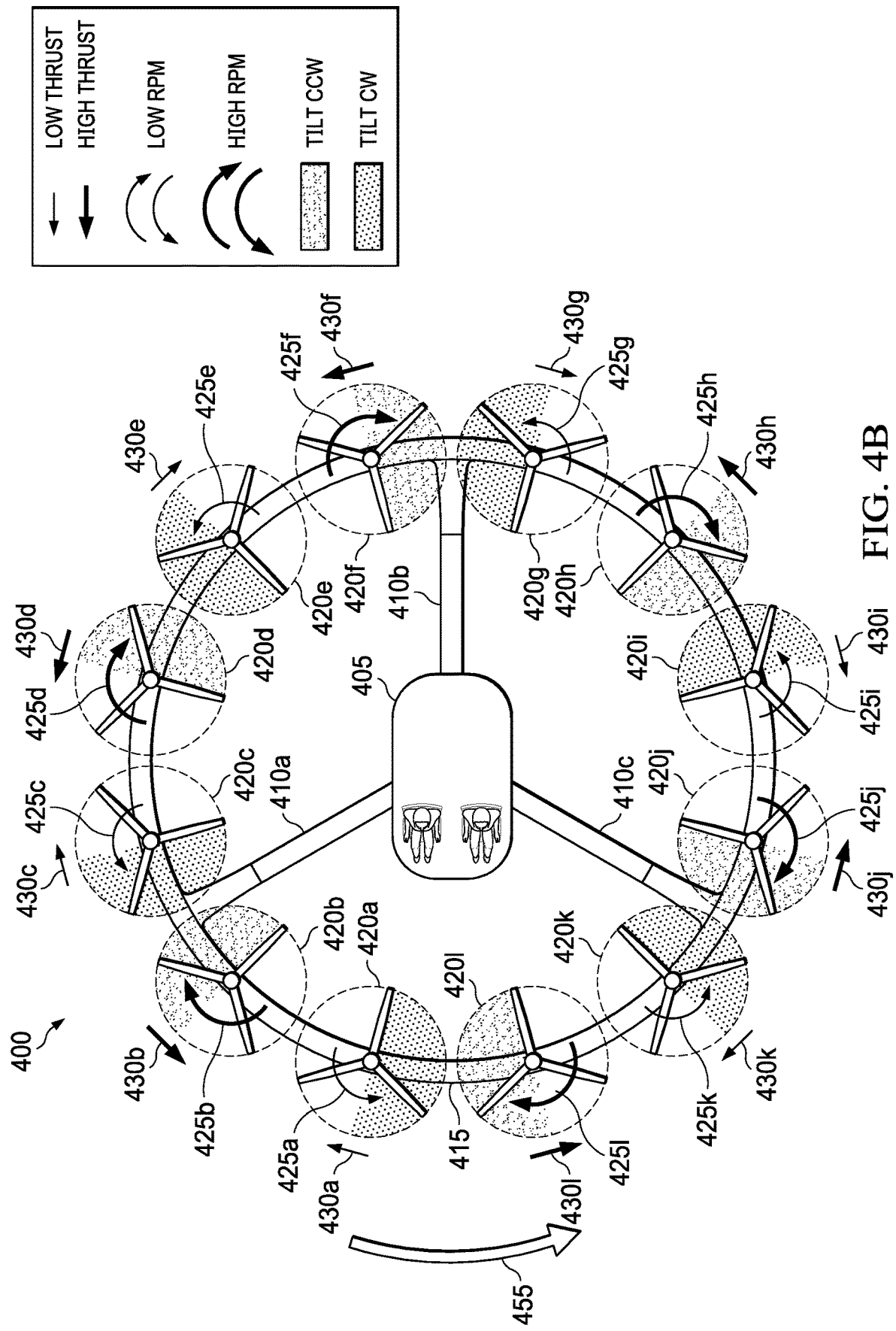
FIG. 4B depicts a plan view of an aircraft with distributed propulsion in a left yaw according to a third embodiment of the present invention.
Figure 4C:
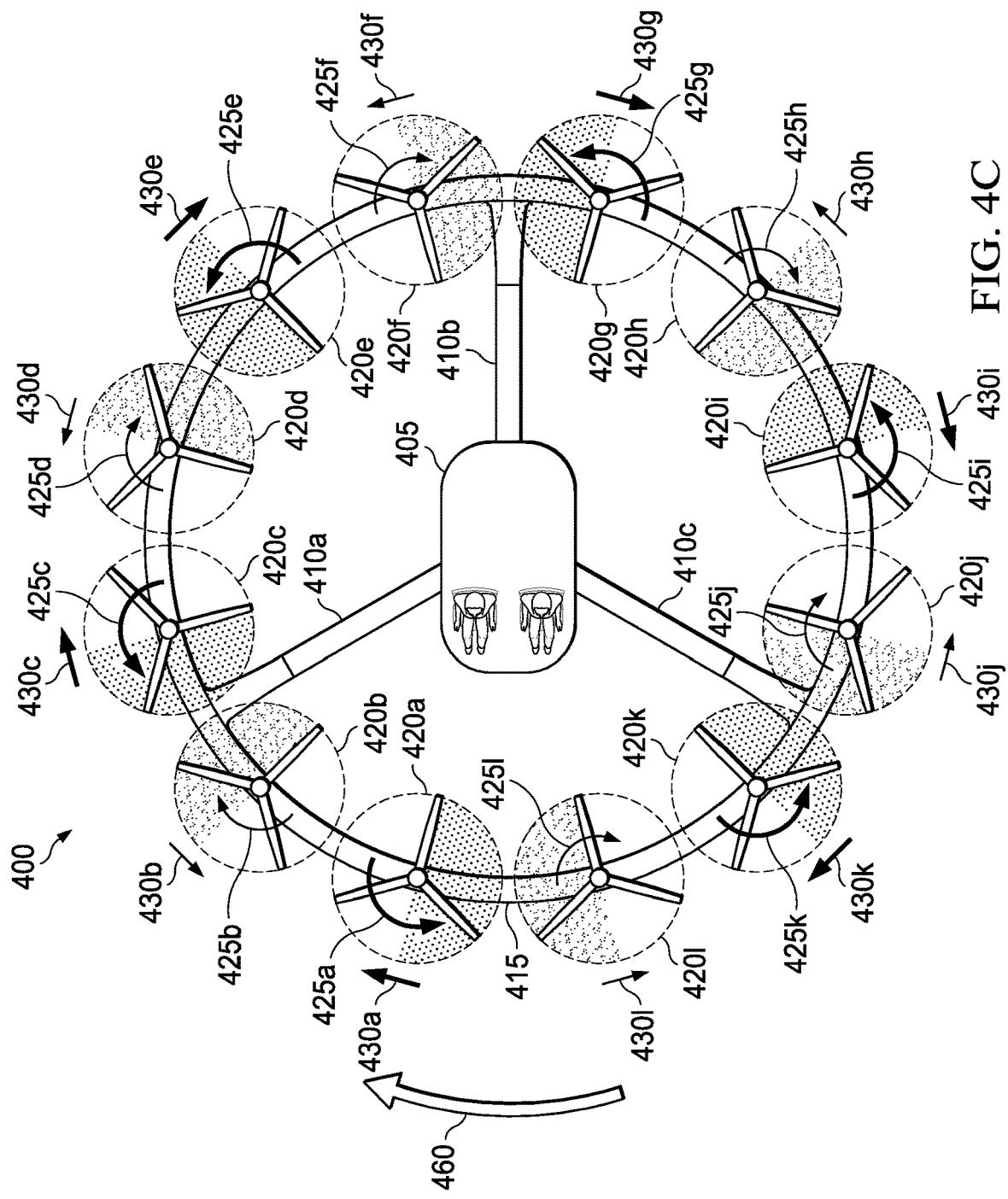
FIG. 4C depicts a plan view of an aircraft with distributed propulsion in a right yaw according to a third embodiment of the present invention.
Figure 4D:
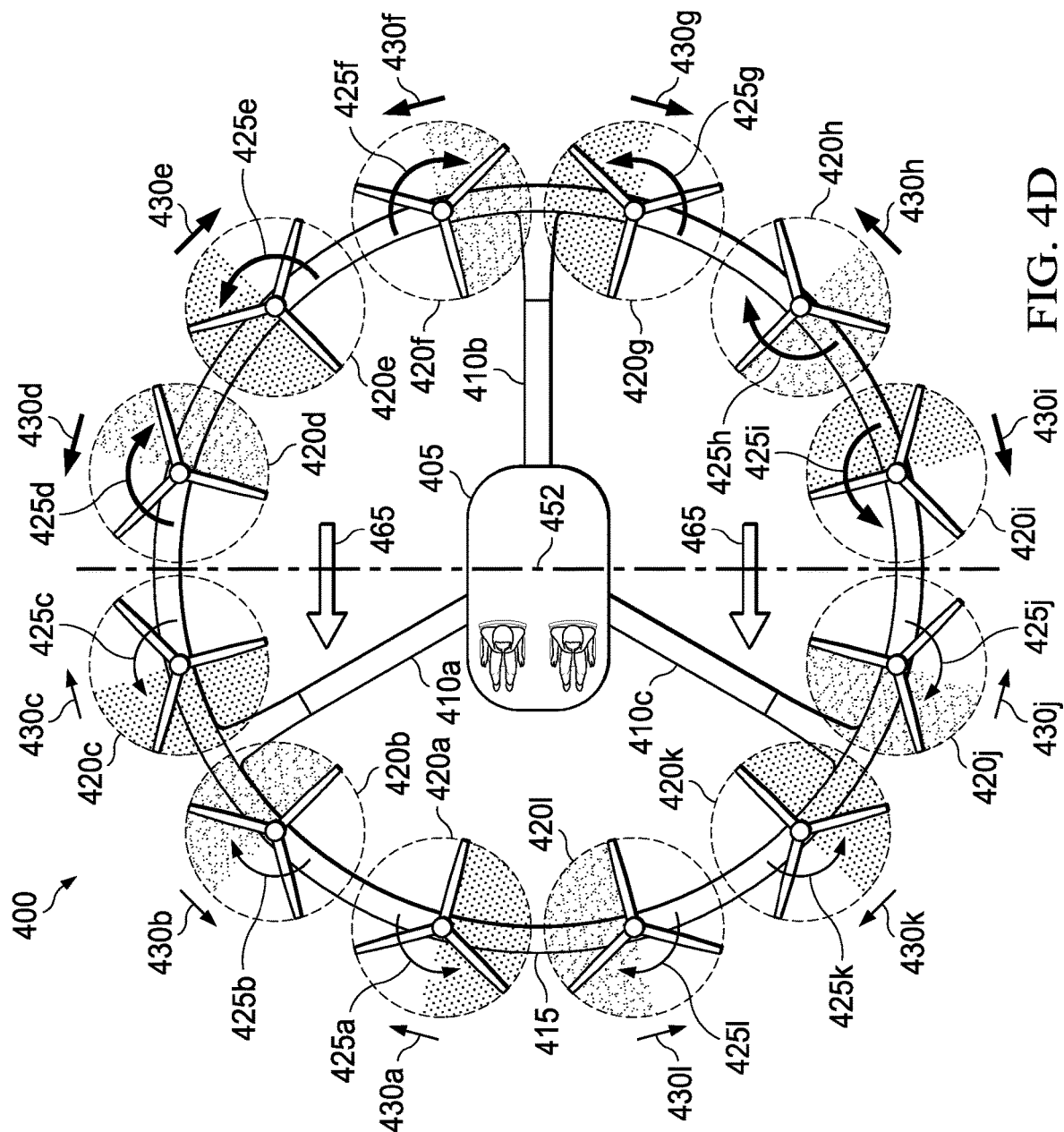
FIG. 4D depicts a plan view of an aircraft with distributed propulsion pitching forward according to a third embodiment of the present invention.
Figure 4E:
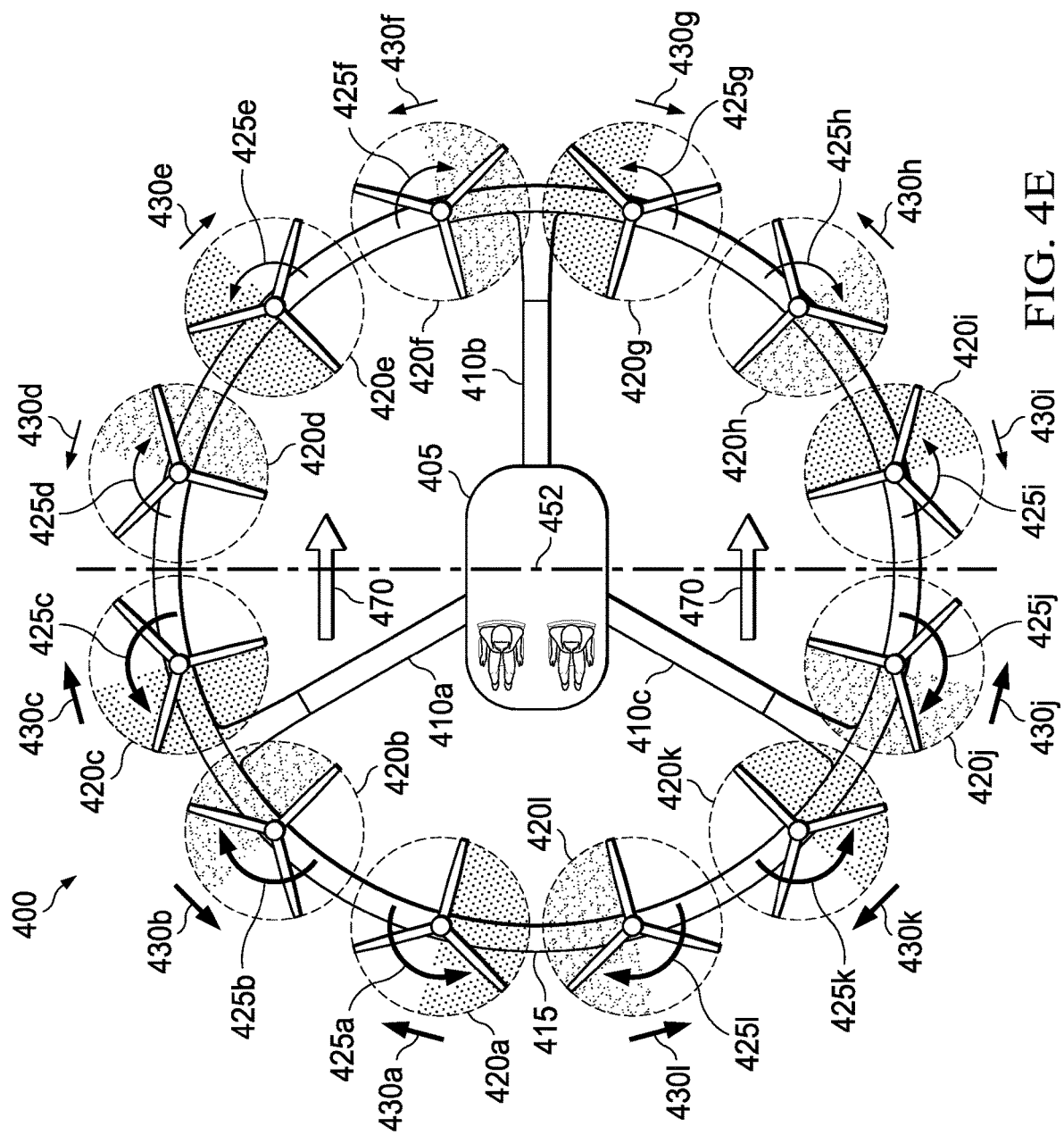
FIG. 4E depicts a plan view of an aircraft with distributed propulsion pitching aft according to a third embodiment of the present invention.
Figure 4F:
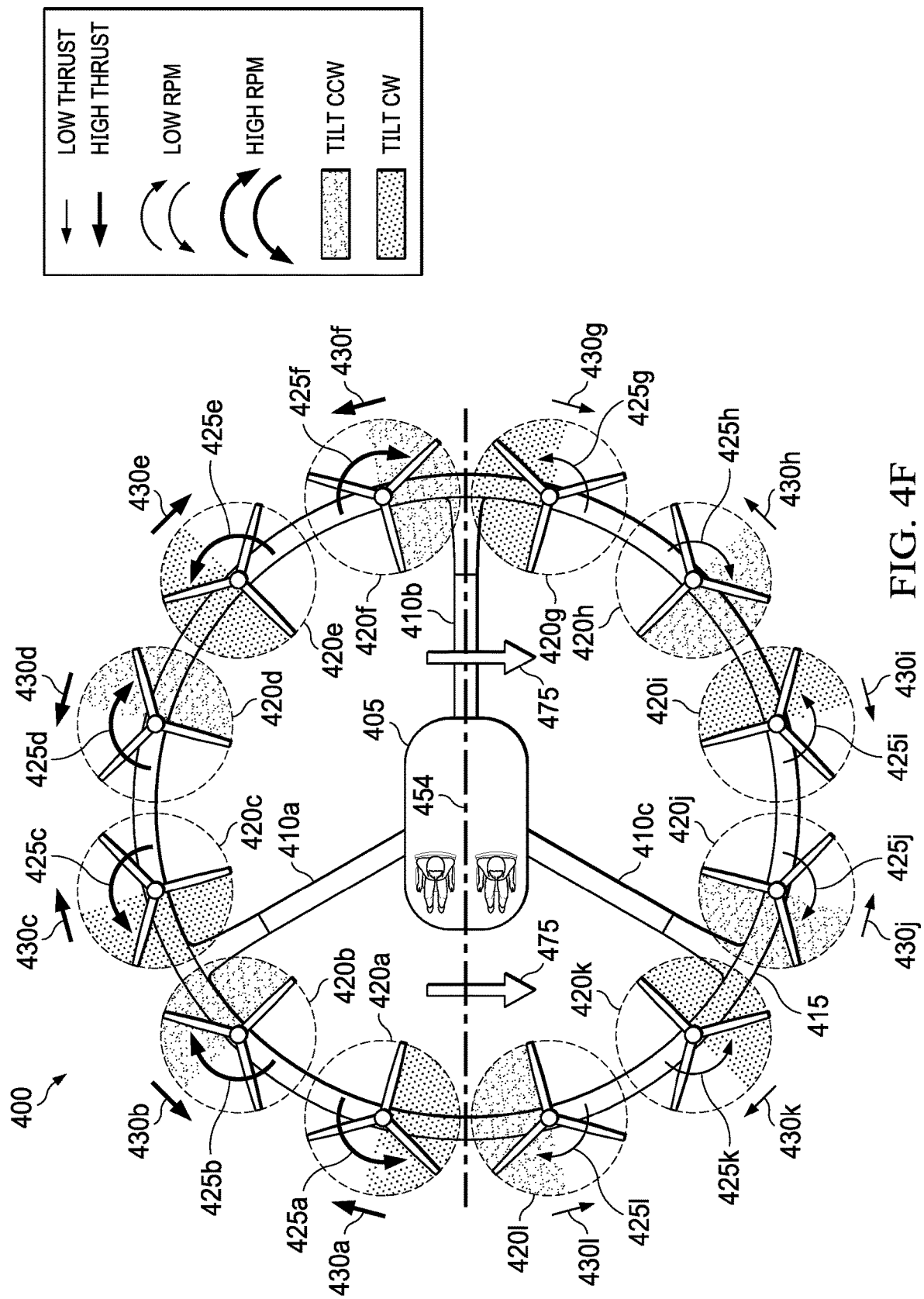
FIG. 4F depicts a plan view of an aircraft with distributed propulsion rolling left according to a third embodiment of the present invention.
Figure 4G:
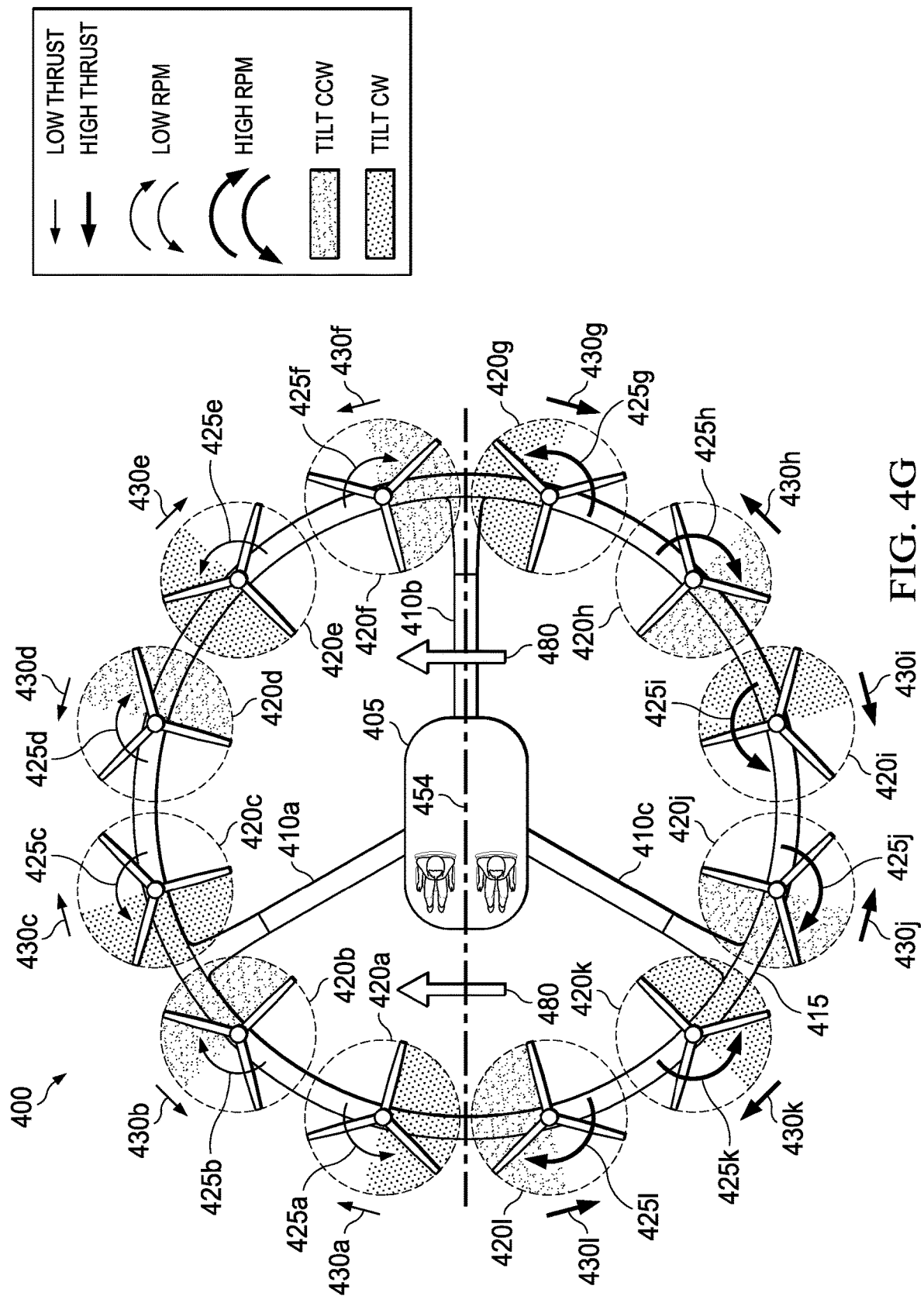
FIG. 4G depicts a plan view of an aircraft with distributed propulsion rolling right according to a third embodiment of the present invention.
Figure 4H:
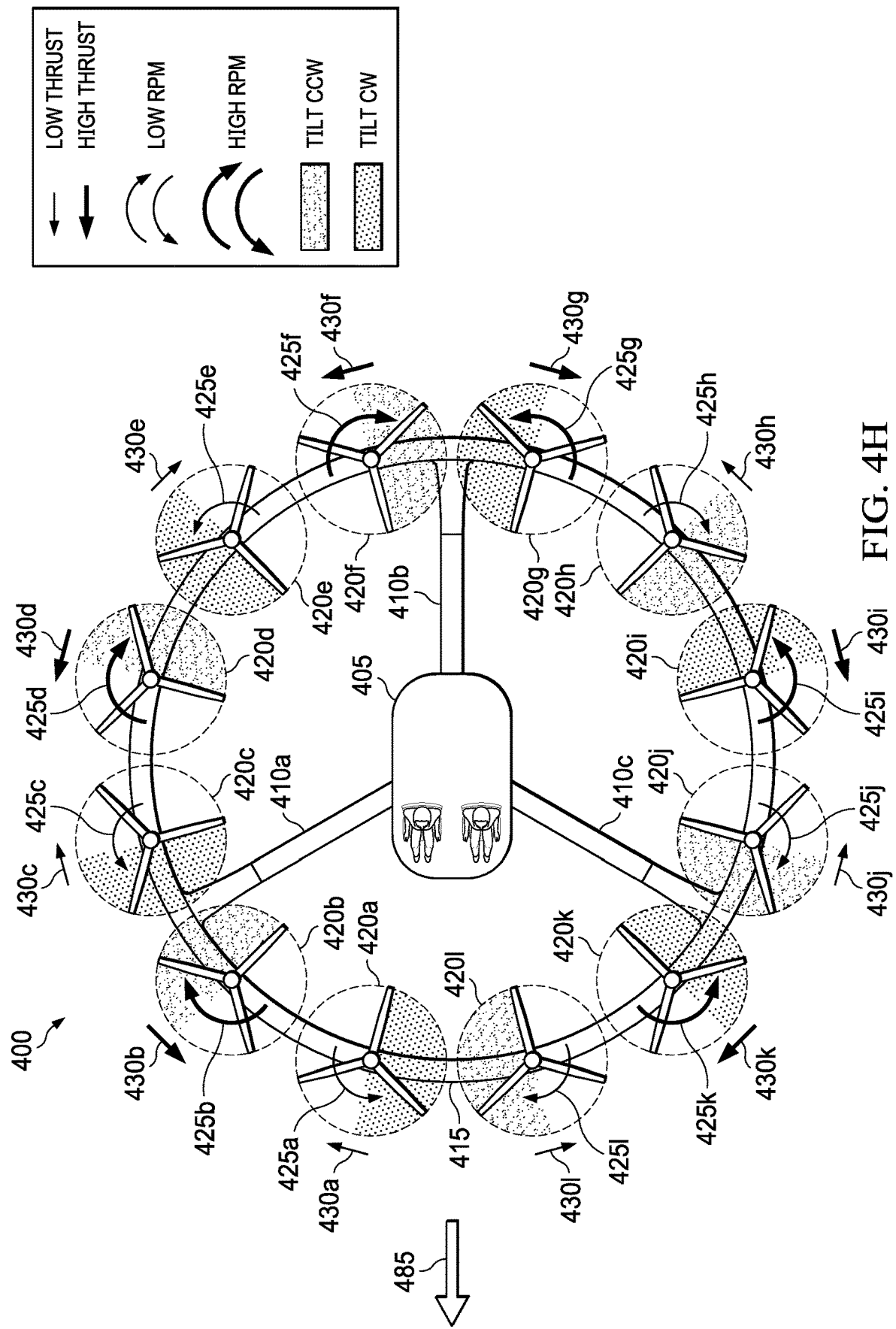
FIG. 4H depicts a plan view of an aircraft with distributed propulsion translating forward according to a third embodiment of the present invention.
Figure 4I:
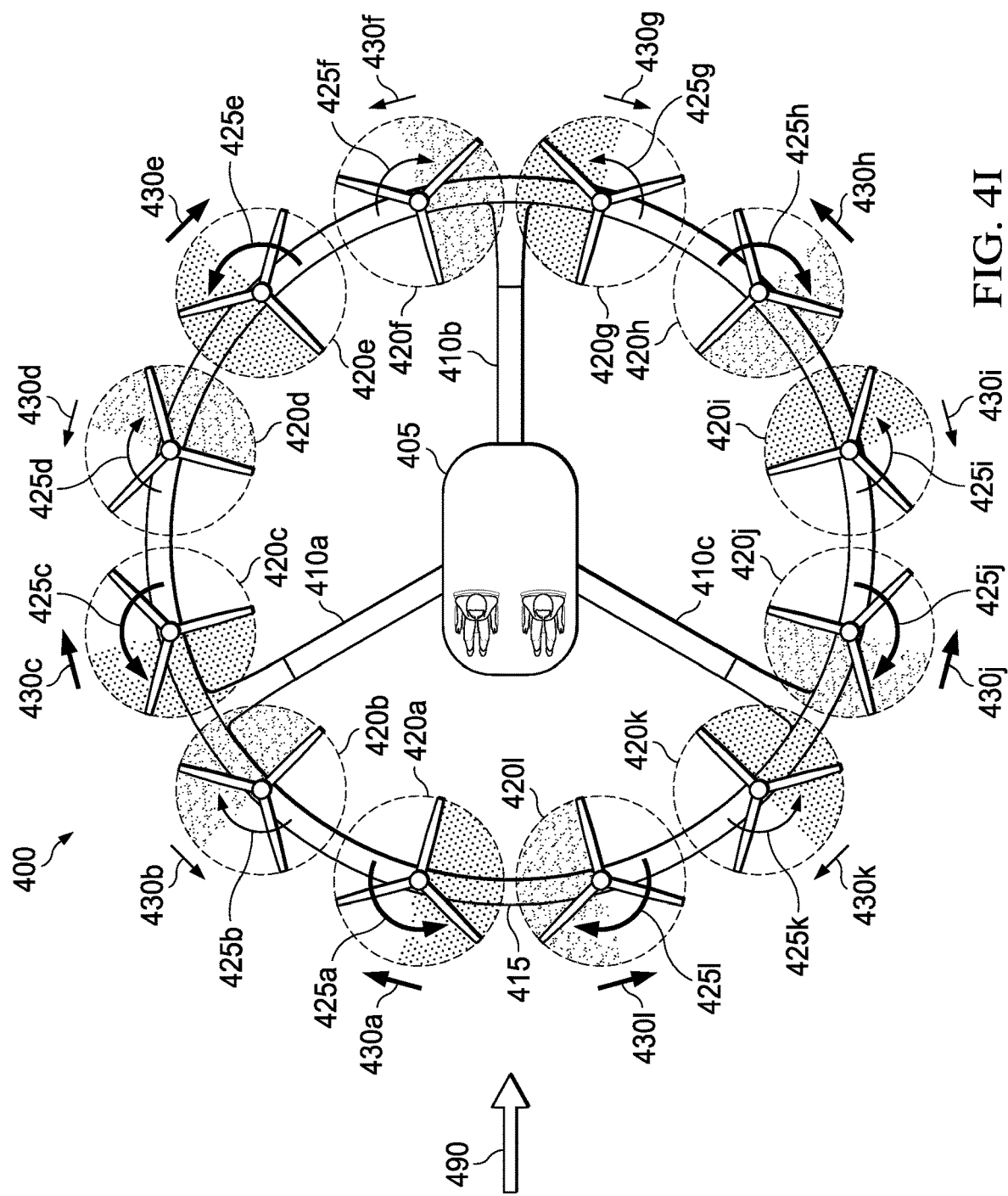
FIG. 4I depicts a plan view an aircraft with distributed propulsion translating aft according to a third embodiment of the present invention.
Figure 4J:
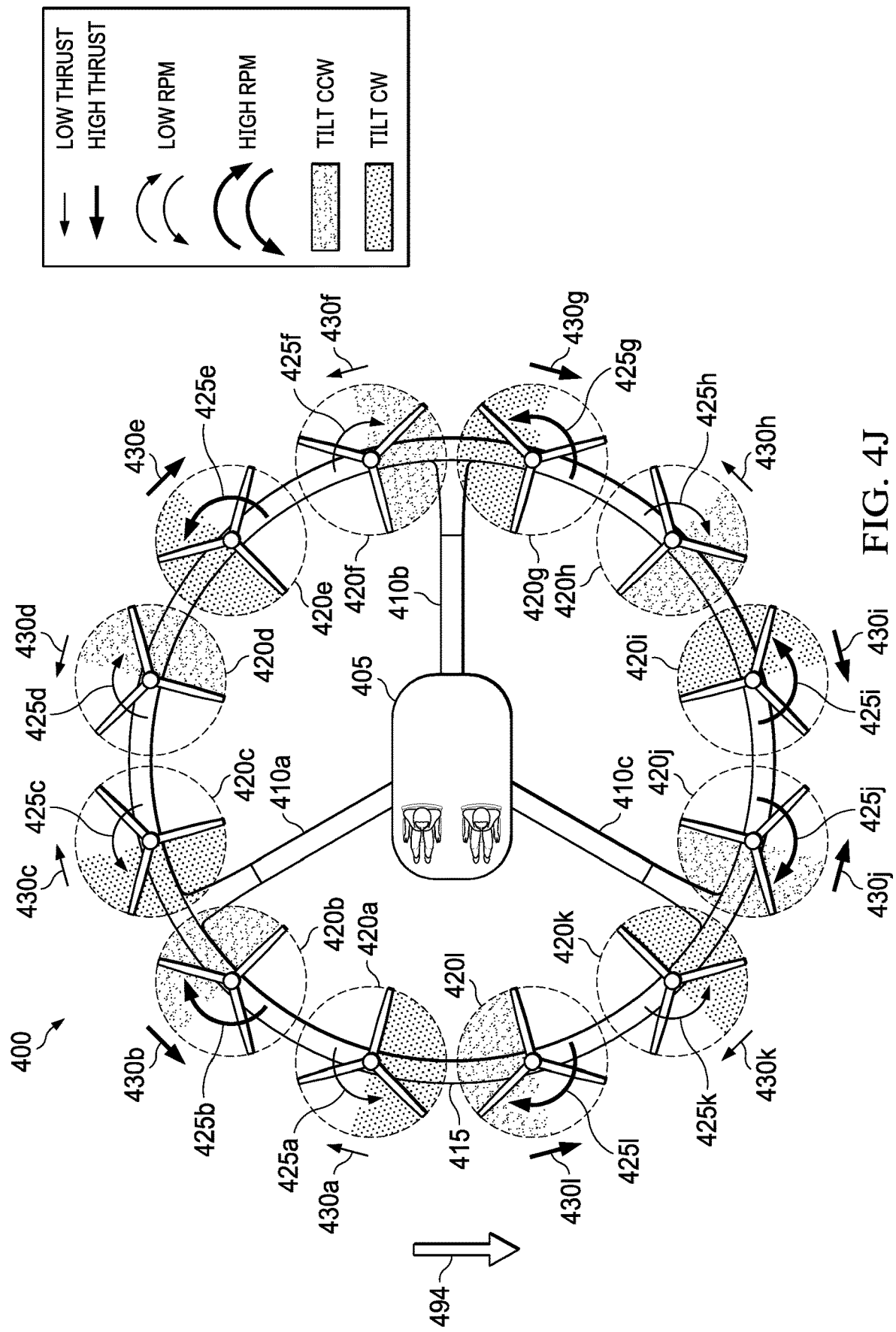
FIG. 4J depicts a plan view of an aircraft with distributed propulsion translating left according to a third embodiment of the present invention.
Figure 4K:
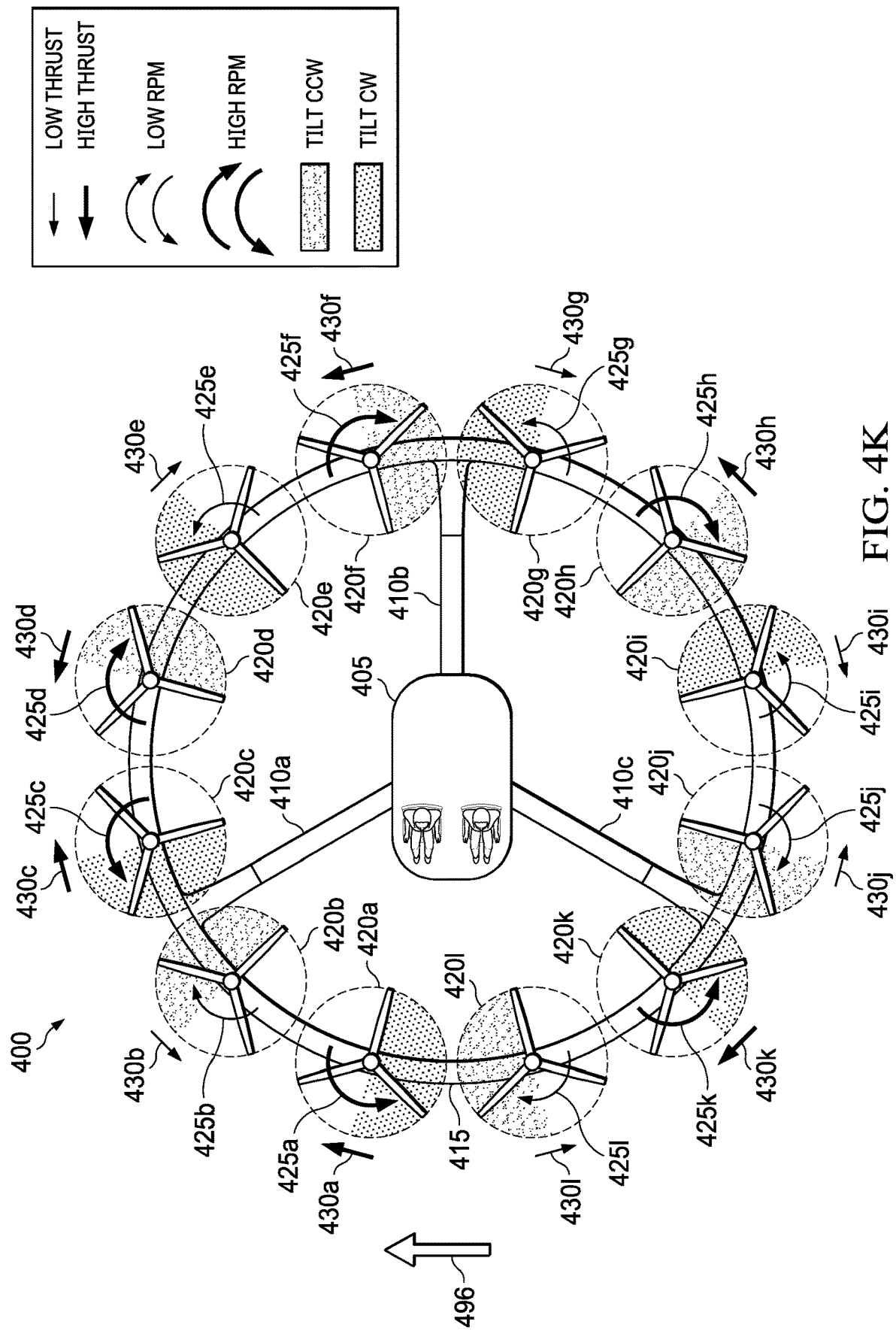
FIG. 4K depicts a plan view of an aircraft with distributed propulsion translating right according to a third embodiment of the present invention.
Figure 4L:
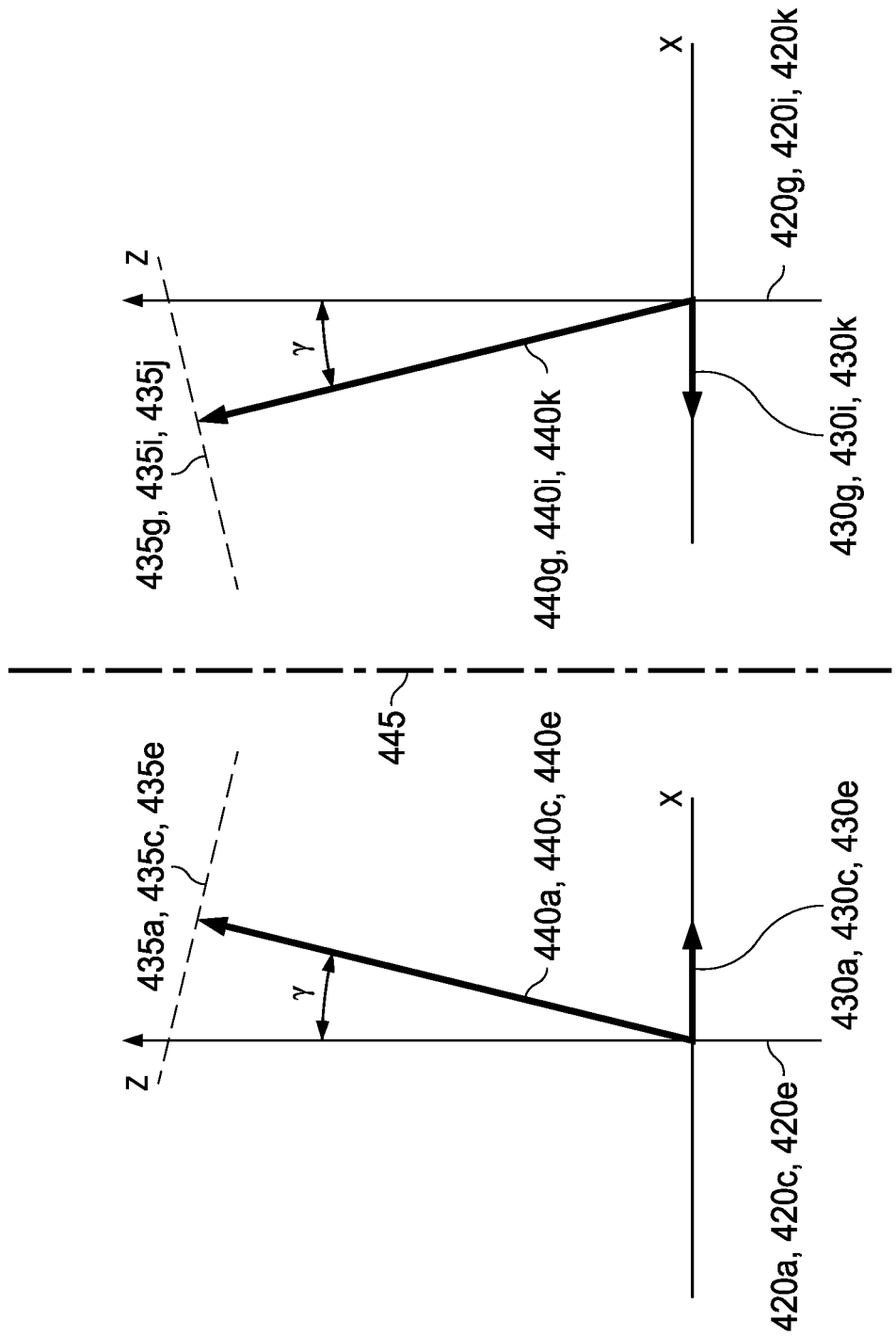
FIG. 4L depicts a tilted rotational axis and tilted plane of rotation of a pair of propellers tilting tangentially clockwise according to a third embodiment of the present invention.
Figure 4M:
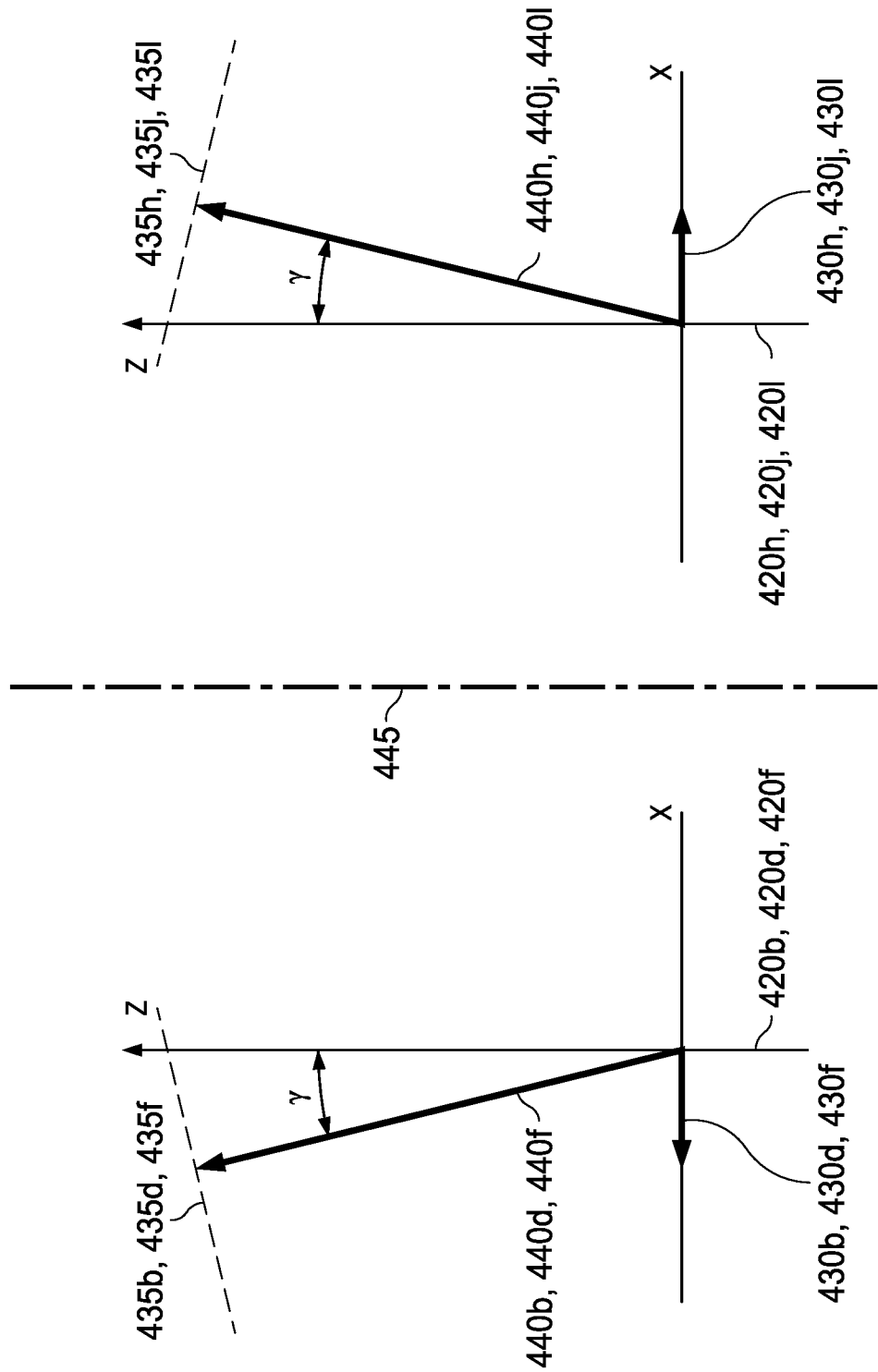
FIG. 4M depicts a tilted rotational axis and tilted plane of rotation of a pair of propellers tilting tangentially counter-clockwise according to a third embodiment of the present invention.

Now also referring to FIG. 4L-4M, each propeller 420a through 420l has a rotation direction indicated by curved arrows 425a through 425l (e.g., clockwise or counterclockwise) within a tilted plane of rotation 435a through 435l based on tilt angle $\gamma$. The rotation direction 425a, 425c, 425e, 425g, 425i, 425k is counterclockwise for 50% of the propellers 420a, 420c, 420e, 420g, 420i, 420k and the rotation direction 425b, 425d, 425f, 425h, 425j, 425l is clockwise for 50% of the propellers 420b, 420d, 420f, 420h, 420j, 420l. As shown, the rotation direction 425a through 425l of the propellers 420a through 420l disposed along the ring wing 415 alternate between a counterclockwise direction 425a, 425c, 425e, 425g, 425i, 425k and a clockwise direction 425b, 425d, 425f, 425h, 425j, 425l. The tilted plane of rotation 435b, 435d, 435f, 435h, 435j, 435l is tilted left along a tangential line intersecting the ring wing 415 at the propeller location for 50% of the two or more propellers 420b, 420d, 420f, 420h, 420j, 420l such that the X-axis is a tangential line intersecting the ring wing 415 at the propeller location. The tilted plane of rotation 435a, 435c, 435e, 435g, 435i, 435k is tilted right along a tangential line intersecting the ring wing 415 at the propeller location for 50% of the two or more propellers 420a, 420c, 420e, 420g, 420i, 420k such that the X-axis is a tangential line intersecting the ring wing 415 at the propeller location. The direction of tilting of the propellers 420a through 420l disposed along the ring wing 415 alternate between tilting right tangentially and tilting left tangentially. Moreover, a summation of horizontal force vectors 430a through 430l created by the tilted plane of rotation 435a through 435l of all the propellers 420a through 420l is substantially zero when all the propellers 420a through 420l are creating a substantially equal thrust magnitude. The propellers 420a through 420l can be configured in pairs (420a and 420g, 420b and 420h, 420c and 420i, 420d and 420j, 420e and 420k and 420f and 420l), each pair of propellers comprising a first propeller 420a through 420f creating a first thrust having a first horizontal force vector 430a through 430f and a second propeller 420g through 420l creating a second thrust having a second horizontal force vector 430g through 430l, wherein a summation of the first horizontal force vector 430a through 430f and the second horizontal force vector 430g through 430l is substantially zero when the first thrust is substantially equal in magnitude to the second thrust. In one aspect, a summation of horizontal torque vectors (not shown) created by the rotation direction 425a through 425l of all the propellers 420a through 420l is substantially zero when all the propellers 420a through 420l are creating a substantially equal thrust magnitude. The tilt angle $\gamma$ can be selected from about 1 degree to about 15 degrees depending on the aircraft size, weight and engine/motor distribution. Note that sufficient clearance should be maintained between the propellers 420a through 420l and the support structures 410a, 410b, 410c, 415 and fuselage 405. As shown in FIG. 4L, the first rotational axis 440a, 440c, 440e of the first propellers 420a, 420c, 420e are tilted tangentially right (clockwise), and the second rotational axis 440g, 440i, 440k of the second propellers 420g, 410i, 410k are tilted tangentially left (counterclockwise). The tangential plane containing the first rotational axis 440a, 440c, 440e of the first propellers 420a, 420c, 420e is substantially parallel to the tangential plane containing the second rotational axis 440g, 440i, 440k of the second propellers 420g, 410i, 410k. As shown in FIG. 4M, the first rotational axis 440b, 440d, 440f of the first propellers 420b, 420d, 420f are tilted tangentially left (counterclockwise) and the second rotational axis 440h, 440j, 440lf of the second propellers 420h, 420j, 420f are tilted tangentially right (clockwise). The tangential plane containing the first rotational axis 440b, 440d, 440f of the first propellers 420b, 420d, 420f is substantially parallel to the tangential plane containing the second rotational axis 440h, 440j, 440l of the second propellers 420h, 420j, 420l. In order to minimize weight and complexity, the propellers 420a through 420l are preferably fixed pitch propellers and the nacelles are preferably fixed. But in some embodiments, it may be desirable to use variable pitch propellers and/or moveable nacelles.

FIG. 4A depicts the aircraft 400 in hover mode in which all the propellers 420a through 420l are operated at a low RPM, which creates low horizontal thrust 430a through 430l. Positioning the propellers 420a through 420l symmetrically around the center of gravity of the aircraft 400 results in the effective cancellation of all horizontal thrust vectors 430a through 430l for a stable hover. Generally, the propellers 420a through 420l are alternately tilted to provide horizontal thrust vector components in a tangential direction perpendicular to a vector from the propeller to a center of gravity of the aircraft 400. Alternating the right (clockwise) and left (counterclockwise) tangential tilting of the propellers 420a through 420l creates six symmetric thrust vector components directed to drive the aircraft 400 clockwise around the aircraft center of gravity and six symmetric thrust vector components directed to drive the aircraft 400 counterclockwise around the aircraft center of gravity. This provides improved aircraft yaw control using only the differential reaction torque from the propellers. While not having the thrust vector components pass through the center of gravity can generate undesirable coupling of roll, pitch, and yaw control moments, positioning the propellers symmetrically in the array allows for both cancellation of all thrust vector components for a stable hover and provides for mitigation of undesirable coupling. With alternating tangential tilting, the unacceptable lag in the aircraft control response to control commands is alleviated by the immediate lateral and longitudinal response provided by the tilted propeller tangential thrust vectors. This is achieved without the need to add excessive power margin. Additionally, alternating tangential tilting of the propellers provides for lateral and longitudinal directional control of the aircraft 400 completely independent of aircraft pitch and roll. This capability enhances directional control by eliminating the effect of the rotational inertia of the aircraft 400 from lateral and longitudinal control. The aircraft 400 can be moved in a vertical direction by increasing or decreasing a thrust of all of the propellers 420a through 420l.

As shown in FIGS. 4B-4K, movement of the aircraft 400 is controlled by selectively increasing or decreasing a thrust of at least one of the propellers 420a through 420l. The movement can be a lateral motion, a longitudinal motion or a combination thereof without rolling and/or pitching the aircraft 400. The movement may also be a pitch, a roll, a yaw, a translation or a combination thereof. The tilted distributed propulsion system moves the aircraft with a control lag that is less than that of a non-tilted distributed propulsion system. As a result, the present invention provides a control authority that is greater than that of a non-tilted distributed propulsion system. This is achieved without the need to add excessive power margin. Those skilled in the art will understand and appreciate that the differences in control lag and control authority between tilted distributed propulsion systems and non-tilted distributed propulsion systems will vary depending to the aircraft design and distributed propulsion system, but that such terms are understandable and not indefinite based on the teachings herein.

FIG. 4B depicts the aircraft 400 in a left yaw 455. The rotational speeds of all of the propellers 420b, 420d, 420f, 420h, 420j, 420l that rotate in a clockwise direction 425b, 425d, 425f, 425h, 425j, 425l are increased. Operating the clockwise rotating propellers 420b, 420d, 420f, 420h, 420j, 420l at a faster RPM than the counterclockwise rotating propellers 420a, 420c, 420e, 420g, 420i, 420k creates a differential thrust vector and a differential torque to yaw the aircraft 400 counterclockwise, or left 455.

FIG. 4C depicts the aircraft 400 in a right yaw 460. The rotational speeds of all of the propellers 420a, 420c, 420e, 420g, 420i, 420k that rotate in a counterclockwise direction 425a, 425c, 425e, 425g, 425i, 425k are increased. Operating the counterclockwise rotating propellers 425a, 425c, 425e, 425g, 425i, 425k at a faster RPM than the clockwise rotating propellers 420b, 420d, 420f, 420h, 420j, 420l creates a differential thrust vector and a differential torque to yaw the aircraft 400 clockwise, or right 460.

FIG. 4D depicts the aircraft 400 pitching forward 465. The rotational speeds of propellers 420d, 420e, 420f, 420g, 420h, 420i aft of center of gravity centerline 452 are increased. Operating propellers 420d, 420e, 420f, 420g, 420h, 420i aft of center of gravity centerline 452 at a faster RPM than propellers 420a, 420b, 420c, 420j, 420k, 420l creates an immediate forward differential thrust that lifts the aft part of the aircraft 400 to pitch the aircraft 400 forward 465, which minimizes control lag. The sum of the longitudinal thrust vectors can cancel any resulting forward motion.

FIG. 4E depicts the aircraft 400 pitching aft 470. The rotational speeds of propellers 420a, 420b, 420c, 420j, 420k, 420l forward of center of gravity centerline 452 are increased. Operating propellers 420a, 420b, 420c, 420j, 420k, 420l forward of center of gravity centerline 452 at a faster RPM than propellers 420d, 420e, 420f, 420g, 420h, 420i creates an immediate aft differential thrust that lifts the forward part of the aircraft 400 to pitch the aircraft 400 aft 470, which minimizes control lag. The sum of the longitudinal thrust vectors can cancel any resulting forward motion.

FIG. 4F depicts the aircraft 400 rolling left 475. The rotational speeds of propellers 420a, 420b, 420c, 420d, 420e, 420f to the right of center of gravity centerline 454 are increased. Operating propellers 420a, 420b, 420c, 420d, 420e, 420f to the right of center of gravity centerline 454 at a faster RPM than propellers 420g, 420h, 420i, 420j, 420k, 420l creates an immediate left lateral differential thrust that lifts the right part of the aircraft 400 to roll the aircraft 400 left 475, which minimizes control lag. The sum of the lateral thrust vectors can cancel any resulting left lateral motion.

FIG. 4G depicts the aircraft 400 rolling right 480. The rotational speeds of propellers 420g, 420h, 420i, 420j, 420k, 420l to the left of center of gravity centerline 454 are increased. Operating propellers 420g, 420h, 420i, 420j, 420k, 420l to the right of center of gravity centerline 454 at a faster RPM than propellers 420a, 420b, 420c, 420d, 420e, 420f creates an immediate right lateral differential thrust that lifts the left part of the aircraft 400 to roll the aircraft 400 right 480, which minimizes control lag. The sum of the lateral thrust vectors can cancel any resulting right lateral motion.

FIG. 4H depicts the aircraft 400 translating forward 485. The rotational speeds of the propellers 420b, 420d, 420f, 420g, 420i, 420k are increased. Operating the propellers 420b, 420d, 420f, 420g, 420i, 420k at a faster RPM than propellers 420a, 420c, 420e, 420h, 420j, 420l creates an immediate forward acting differential thrust that translates the aircraft 400 forward 485, which minimizes control lag. The sum of the forward and aft pitch moments can cancel any resulting forward pitching motion.

FIG. 4I depicts the aircraft 400 translating aft 490. The rotational speeds of propellers 420a, 420c, 420f, 420e, 420h, 420j, 420l are increased. Operating propellers 420a, 420c, 420f, 420e, 420h, 420j, 420l at a faster RPM than propellers 420b, 420d, 420f, 420g, 420i, 420k creates an immediate aft acting differential thrust that translates the aircraft 400 aft 490, which minimizes control lag. The sum of the forward and aft pitch moments can cancel any resulting aft pitching motion.

FIG. 4J depicts the aircraft 400 translating left 494. The rotational speeds of propellers 420b, 420e, 420g, 420i, 420j, 420l are increased. Operating propellers 420b, 420e, 420g, 420i, 420j, 420l at a faster RPM than propellers 420a, 420c, 420d, 420f, 420h, 420k creates an immediate left acting differential thrust that translates the aircraft 400 left 494, which minimizes control lag. The sum of the left and right roll moments can cancel any resulting left rolling motion.

FIG. 4K depicts the aircraft 400 translating right 496. The rotational speeds of propellers 420a, 420c, 420d, 420f, 420h, 420k are increased. Operating the propellers 420a, 420c, 420d, 420f, 420h, 420k at a faster RPM than propellers 420b, 420e, 420g, 420i, 420j, 420l creates an immediate right acting differential thrust that translates the aircraft 400 right 496, which minimizes control lag. The sum of the left and right roll moments can cancel any resulting right rolling motion.

Figure 5A:
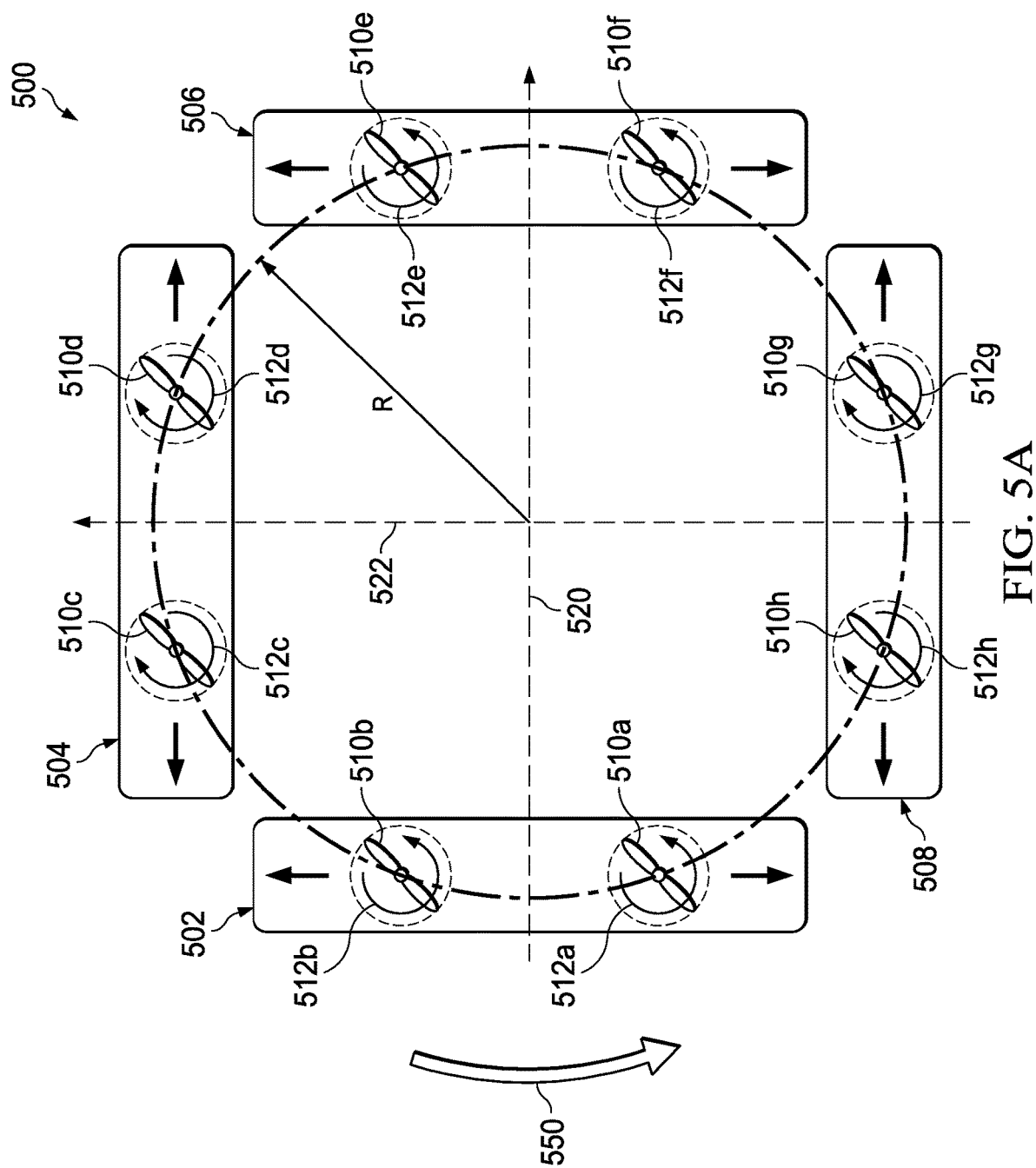
FIG. 5A depicts a plan view of a distributed propulsion system in a left yaw according to a fourth embodiment of the present invention.
Figure 5B:
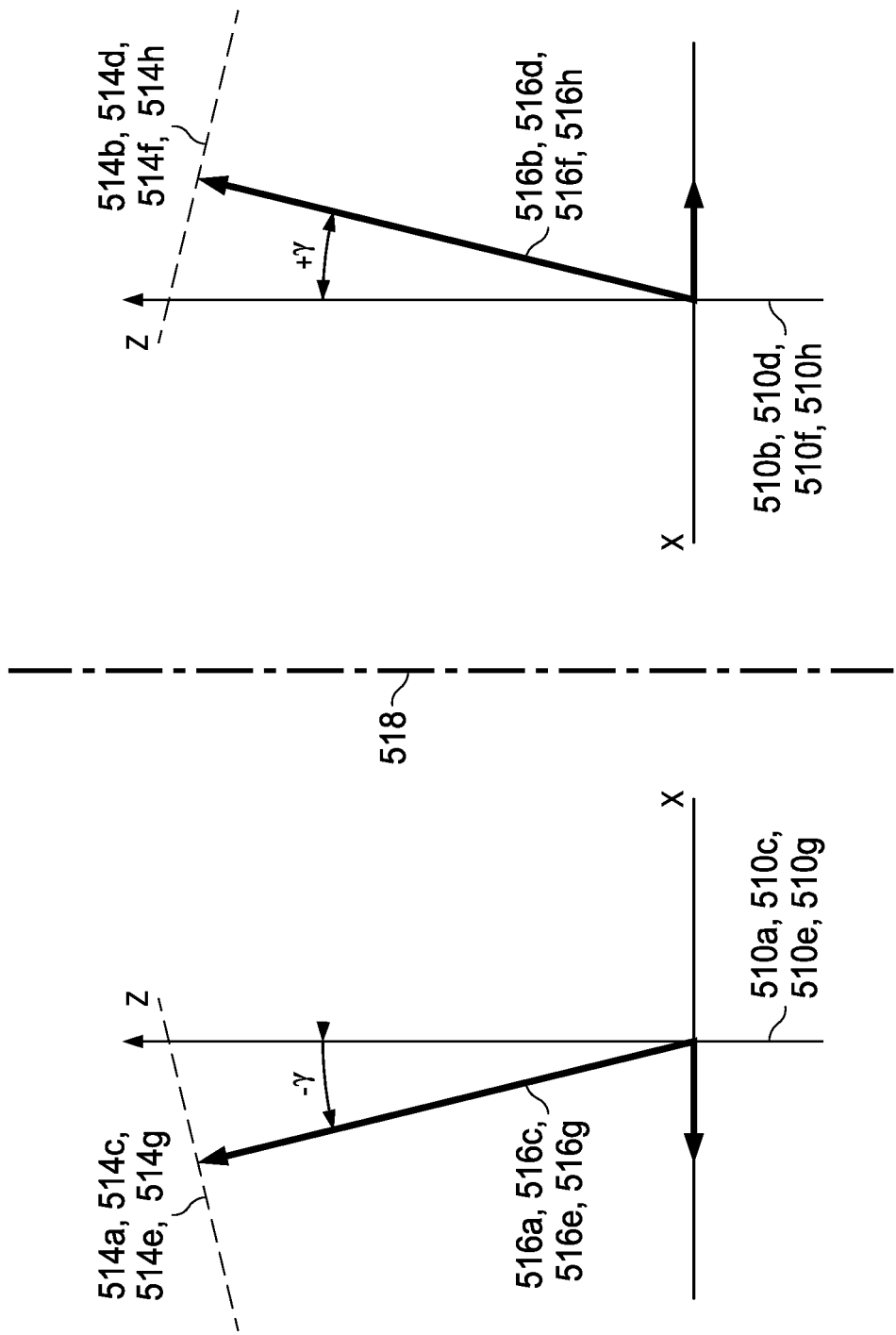
FIG. 5B depicts a tilted rotational axis and tilted plane of rotation of a pair of propellers tilting at a negative and positive tilt angle with respect to a vertical axis.

FIG. 5A depicts a plan view of a distributed propulsion system 500 in a left yaw 550 according to a fourth embodiment of the present invention. The two or more propellers are configured in four or more pairs of propellers along the ring wing: a first pair 502 of propellers 510a, 510b disposed along the ring wing, a second pair 504 of propellers 510c, 510d disposed along the ring wing, a third pair 506 of propellers 510e, 510f disposed along the ring wing, and a fourth pair 508 of propellers 510g, 510h disposed along the ring wing. Now also referring to FIG. 5B, each propeller 510a through 510h has a rotation direction 512a through 512h indicated by curved arrows (e.g., clockwise or counterclockwise) within a tilted plane of rotation 514a through 514h based on tilt angle γ. The rotation direction of the first pair 502 of propellers 510a, 510b and the third pair 506 of propellers of propellers 510e, 510f is counterclockwise. The rotation direction of the second pair 504 of propellers 510c, 510d and the fourth pair 508 of propellers 510g, 510h is clockwise. Each pair of propellers 502, 504, 506, 508 includes a first propeller 510a, 510c, 510e, 510g having a first rotational axis 516a, 516c, 516e, 516g, a second propeller 510b, 510d, 510f, 510h having a second rotational axis 516b, 516d, 516f, 516h, and a vertical axis 518 disposed between the first propeller 510a, 510c, 510e, 510g and the second propeller 510b, 510d, 510f, 510h. The first rotational axis 516a, 516c, 516e, 516g and the second rotational axis 516b, 516d, 516f, 516h are substantially coplanar with respect to the vertical axis 518. The first rotational axis 516a, 516c, 516e, 516g has a negative tilt angle −γ with respect to the vertical axis 518, the second rotational axis 516b, 516d, 516f, 516h has a positive tilt angle +γ with respect to the vertical axis 518, and the positive tilt angle +γ and the negative tilt angle −γ have a substantially equal magnitude. As shown, the vertical axis 518 is perpendicular to first center of gravity centerline 520 or a second center of gravity centerline 522. The rotational speeds of propellers 510a, 510c, 510e, 510g are increased. Operating propellers 510a, 510c, 510e, 510g at a faster RPM than propellers 510b, 510d, 510f, 510h creates a differential thrust vector to yaw the aircraft counterclockwise, or left 550.

The distributed propulsion system 500 can be applied to an aircraft as described above. Moreover, the distributed propulsion system 500 can be operated to move the aircraft in any of the directions described above.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above", "below", "upper", "lower", or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. An aircraft having a distributed propulsion system, the aircraft comprising:
    a fuselage;
    one or more support structures connected to the fuselage, the one or more support structures comprising a closed or ring wing and one or more spokes;
    one or more engines or motors disposed within or attached to the one or more support structures or the fuselage;
    the distributed propulsion system comprising two or more propellers symmetrically distributed along the one or more support structures and operably connected to the one or more engines or motors, wherein each propeller has a rotation direction within a tilted plane of rotation; and
    the two or more propellers are configured in pairs, each pair of propellers comprising a first propeller creating a first thrust having a first horizontal force vector and a second propeller creating a second thrust having a second horizontal force vector, wherein a summation of the first and second horizontal force vectors is substantially zero when the first thrust is substantially equal to the second thrust, and a first rotational axis of the first propeller and a second rotational axis of the second propeller are substantially coplanar with a vertical axis disposed between the respective pair of propellers;
    wherein a movement of the aircraft is controlled by selectively increasing or decreasing a thrust of at least one of the two or more propellers.

2. The aircraft of claim 1, wherein:
    the first propeller and the second propeller are proximate to one another;
    the first propeller and the second propeller rotate in the same direction; and
    the first rotational axis has a negative tilt angle with respect to the vertical axis, the second rotational axis has a positive tilt angle with respect to the vertical axis, and the positive tilt angle and the negative tilt angle have a substantially equal magnitude.

3. The aircraft of claim 1, wherein the first propeller has the first rotational axis within a first tangential plane, and the second propeller has the second rotational axis within a second tangential plane, wherein the first tangential plane and the second tangential plane are substantially parallel, the first propeller creates a clockwise thrust, and the second propeller creates a counterclockwise thrust.

4. The aircraft of claim 1, wherein the first rotational axis has a negative tilt angle with respect to the vertical axis, the second rotational axis has a positive tilt angle with respect to the vertical axis, and the positive tilt angle and the negative tilt angle have a substantially equal magnitude.

5. The aircraft of claim 1, wherein the rotation direction is clockwise for 50% of the two or more propellers and the rotation direction is counterclockwise for 50% of the two or more propellers.

6. The aircraft of claim 1, wherein the tilted plane of rotation is tilted towards a center of gravity of the aircraft for all of the two or more propellers.

7. The aircraft of claim 6, wherein the tilted plane of rotation is tilted towards the center of gravity of the aircraft for 50% of the two or more propellers and the tilted plane of rotation is tilted away from the center of gravity of the aircraft for 50% of the two or more propellers.

8. The aircraft of claim 6, wherein the tilted plane of rotation is titled tangentially with respect to the center of gravity of the aircraft such that 50% of the two or more propellers create a clockwise thrust with respect to the center of gravity and 50% of the two or more propellers create a counterclockwise thrust with respect to the center of gravity.

9. The aircraft of claim 1, wherein the two or more propellers are fixed pitch propellers.

10. The aircraft of claim 1, wherein a summation of horizontal torque vectors created by the rotation direction of all the propellers is substantially zero when all the propellers are creating a substantially equal thrust.

11. An aircraft having a distributed propulsion system, the aircraft comprising:
    a closed wing;
    a fuselage at least partially disposed within a perimeter of the closed wing;
    three or more spokes connecting the fuselage to the closed wing;
    one or more motors disposed within or attached to the one or more spokes or the fuselage;
    the distributed propulsion system comprising two or more propellers distributed along the three or more spokes and operably connected to the one or more motors, wherein each propeller has a rotation direction within a tilted plane of rotation; and
    to the two or more propellers are configured in pairs, each pair of propellers comprising a first propeller creating a first thrust having a first horizontal force vector and a second propeller creating a second thrust having a second horizontal force vector, wherein a summation of the first and second horizontal force vectors is substantially zero when the first thrust is substantially equal to the second thrust, and a first rotational axis of the first propeller and a second rotational axis of the second propeller are substantially coplanar with a vertical axis disposed between the respective pair of propellers;
    wherein a movement of the aircraft is controlled by selectively increasing or decreasing a thrust of at least one of the two or more propellers.

12. The aircraft of claim 11, wherein:
    the first propeller and the second propeller are proximate to one another;
    the first propeller and the second propeller rotate in the same direction; and
    the first rotational axis has a negative tilt angle with respect to the vertical axis, the second rotational axis has a positive tilt angle with respect to the vertical axis, and the positive tilt angle and the negative tilt angle have a substantially equal magnitude.

13. The aircraft of claim 11, wherein the first propeller has the first rotational axis within a first tangential plane, and the second propeller has the second rotational axis within a second tangential plane, wherein the first tangential plane and the second tangential plane are substantially parallel, the first propeller creates a clockwise thrust, and the second propeller creates a counterclockwise thrust.

14. The aircraft of claim 11, the first rotational axis has a negative tilt angle with respect to the vertical axis, the second rotational axis has a positive tilt angle with respect to the vertical axis, and the positive tilt angle and the negative tilt angle have a substantially equal magnitude.

15. The aircraft of claim 11, wherein the rotation direction is clockwise for 50% of the two or more propellers and the rotation direction is counterclockwise for 50% of the two or more propellers.

16. The aircraft of claim 11, wherein the tilted plane of rotation is tilted towards a center of gravity of the aircraft for all of the two or more propellers.

17. The aircraft of claim 16, wherein the tilted plane of rotation is tilted towards the center of gravity of the aircraft for 50% of the two or more propellers and the tilted plane of rotation is tilted away from the center of gravity of the aircraft for 50% of the two or more propellers.

18. The aircraft of claim 16, wherein the tilted plane of rotation is titled tangentially with respect to the center of gravity of the aircraft such that 50% of the two or more propellers create a clockwise thrust with respect to the center of gravity and 50% of the two or more propellers create a counterclockwise thrust with respect to the center of gravity.

19. The aircraft of claim 11, wherein the two or more propellers are fixed pitch propellers.

20. The aircraft of claim 11, wherein a summation of horizontal torque vectors created by the rotation direction of all the propellers is substantially zero when all the propellers are creating a substantially equal thrust.

* * * * *